United States Patent [19]

Nanno et al.

[11] Patent Number: 5,553,294
[45] Date of Patent: Sep. 3, 1996

[54] PORTABLE COMPUTER POWERED BY RECHARGEABLE BATTERIES

[75] Inventors: Nobuyuki Nanno; Kazuo Akashi; Makoto Ando; Kōuichirou Takeguchi; Yuji Yamanaka; Toshimitsu Saito; Mayumi Oka; Atsuhiro Ootake; James Mason; Yoshiaki Suzuki, all of Tokyo, Japan

[73] Assignee: Kabushiki Kaisha Toshiba, Kawasaki, Japan

[21] Appl. No.: 72,689

[22] Filed: Jun. 7, 1993

Related U.S. Application Data

[63] Continuation of Ser. No. 718,359, Jun. 24, 1991, abandoned.

[30] Foreign Application Priority Data

| Jun. 25, 1990 | [JP] | Japan | 2-166205 |
| Jun. 25, 1990 | [JP] | Japan | 2-166206 |
| Jun. 25, 1990 | [JP] | Japan | 2-166207 |
| Jun. 25, 1990 | [JP] | Japan | 2-166211 |
| Jun. 25, 1990 | [JP] | Japan | 2-166212 |

[51] Int. Cl.$^6$ ............... G06F 1/00; H02J 9/06
[52] U.S. Cl. ............... 395/750; 364/707; 307/60; 307/65; 307/66; 307/157; 365/226; 365/229
[58] Field of Search ............... 395/750; 364/200, 364/707; 365/226, 229; 307/60, 66, 65, 157

[56] References Cited

U.S. PATENT DOCUMENTS

| 4,315,162 | 2/1982 | Ferguson | 365/229 |
| 4,365,290 | 12/1982 | Nelms et al. | 395/750 |
| 4,611,289 | 9/1986 | Coppola | 364/492 |
| 4,621,330 | 11/1986 | Weikel | 364/900 |
| 4,698,578 | 10/1987 | Mullersman et al. | 307/66 |
| 4,768,162 | 8/1988 | Nishimura | 395/750 |
| 4,782,355 | 11/1988 | Sakai et al. | 395/750 |
| 4,809,163 | 2/1989 | Hirosawa et al. | 395/750 |
| 4,851,756 | 7/1989 | Schaller et al. | 307/66 |
| 4,984,185 | 1/1991 | Saito | 364/707 |
| 5,148,042 | 9/1992 | Nakazoe | 307/60 |
| 5,239,495 | 8/1993 | Nanno et al. | 364/707 |
| 5,270,946 | 12/1993 | Shibasaki et al. | 395/750 |

FOREIGN PATENT DOCUMENTS

| 0273322 | 7/1988 | European Pat. Off. . |
| 0293664 | 12/1988 | European Pat. Off. . |
| 0335316 | 10/1989 | European Pat. Off. . |
| 0340794 | 11/1989 | European Pat. Off. . |
| 57-199979 | 12/1982 | Japan . |
| 2226715 | 7/1990 | United Kingdom . |

OTHER PUBLICATIONS

Toshiba T1600 Portable Personal Computer User's Manual, (1988), first edition, pp. 4–18 through 4–27.
Toshiba T1600 Portable Personal Computer User's Manual, (1988), first edition, pp. vi, vii, 4–27.
Chip Zeitschrift Fuer Mikrocomputer–Technik, No. 11, Nov. 1989, Wurzburg De, p. 29, Computer des jahres.

*Primary Examiner*—George B. Davis
*Attorney, Agent, or Firm*—Finnegan, Henderson, Farabow, Garrett & Dunner, L.L.P.

[57] ABSTRACT

When a computer is not externally powered, it operates from installed first and second batteries. In top surface of the computer, LEDs are provided which indicates three states of each battery; need of charging, during charging, and completion of charging.

14 Claims, 18 Drawing Sheets

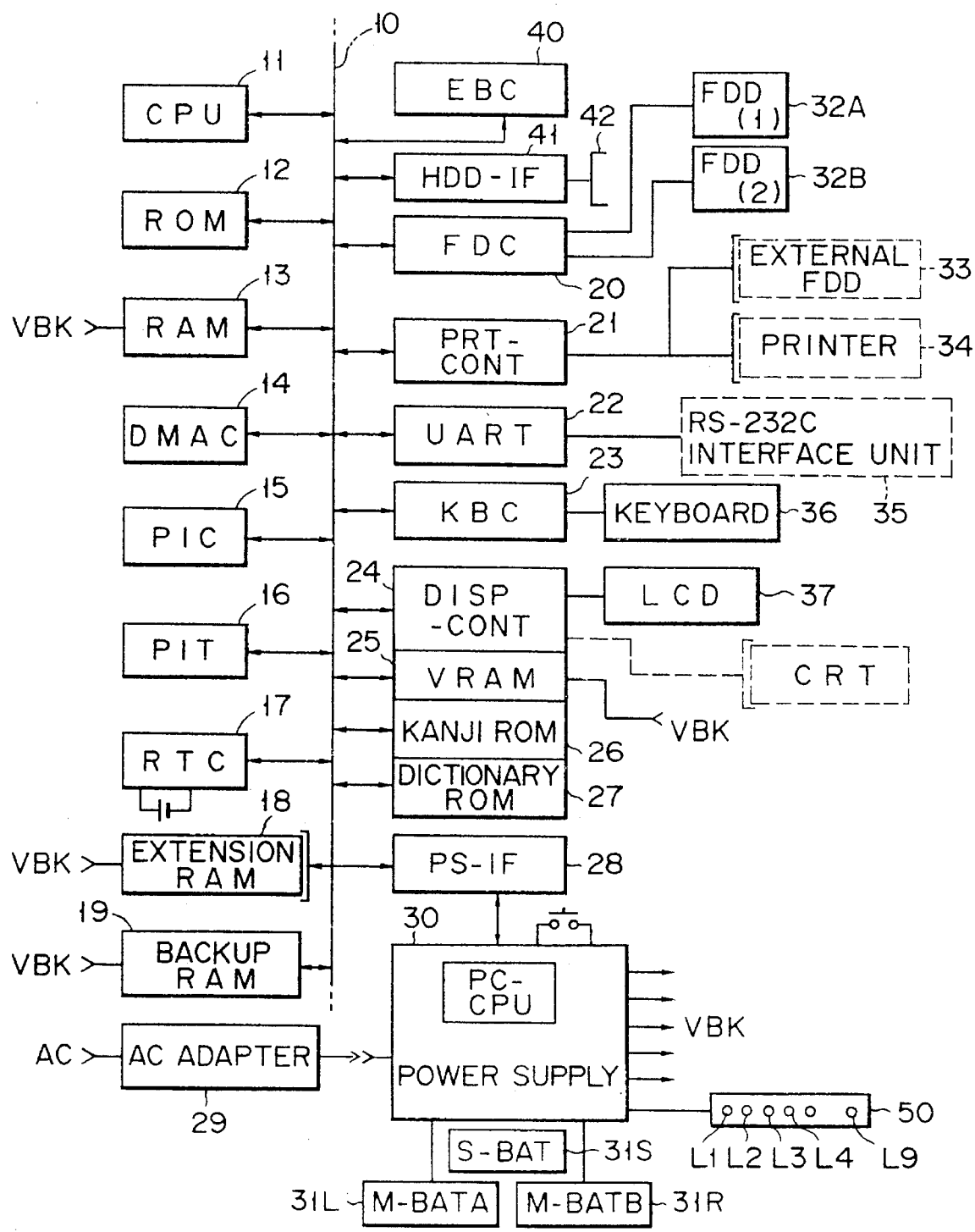
F I G. 1

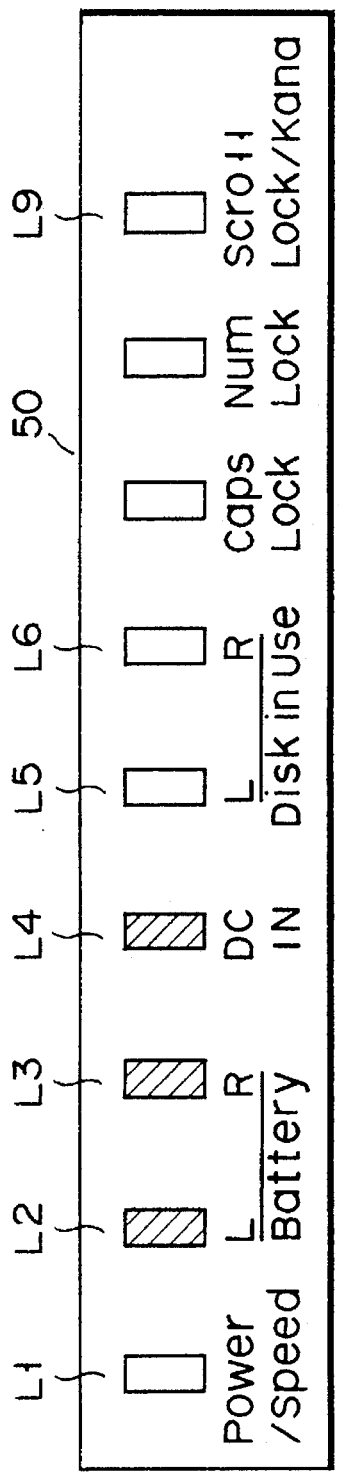

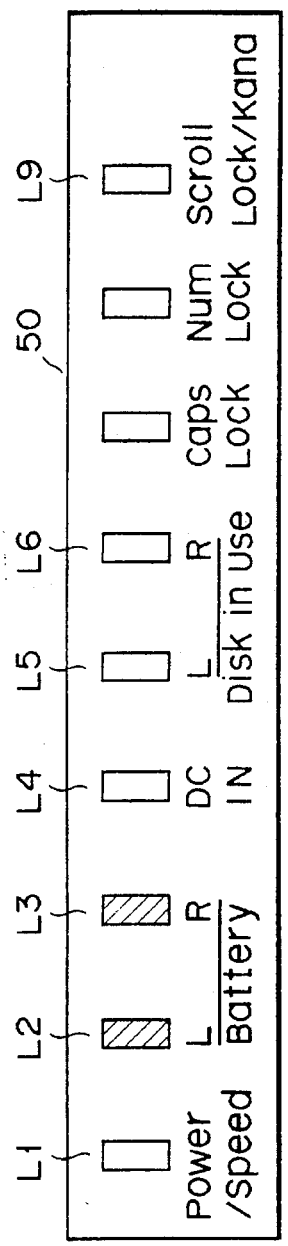

| L/Battery | R | DC IN | STATE DISPLAY CONTENTS |
|---|---|---|---|
| OFF | GREEN ON | OFF | MAIN BODY IS BEING DRIVEN WITH R-BATTERY |
| GREEN ON | OFF | OFF | MAIN BODY IS BEING DRIVEN WITH L-BATTERY |
| L2 | L3 | L4 | |

FIG. 6C

| L/Battery | R | DC IN | STATE DISPLAY CONTENTS |
|---|---|---|---|
| GREEN ON | GREEN ON | ON | MAIN BODY IS BEING DRIVEN WITH R-BATTERY R-BATTERY IS USED UP CHARGING IS REQUIRED |
| RED → | RED → | ON | MAIN BODY IS BEING DRIVEN WITH L-BATTERY R-BATTERY IS USED UP CHARGING IS REQUIRED |
| GREEN ON | RED | ON | L-BATTERY IS ALSO USED UP CHARGING IS REQUIRED |
| RED FLICKER | RED | ON | R-BATTERY IS USED UP CHARGING IS REQUIRED |
| (POWER IS CUT OFF AUTOMATICALLY) | | | |
| L2 | L3 | L4 | |

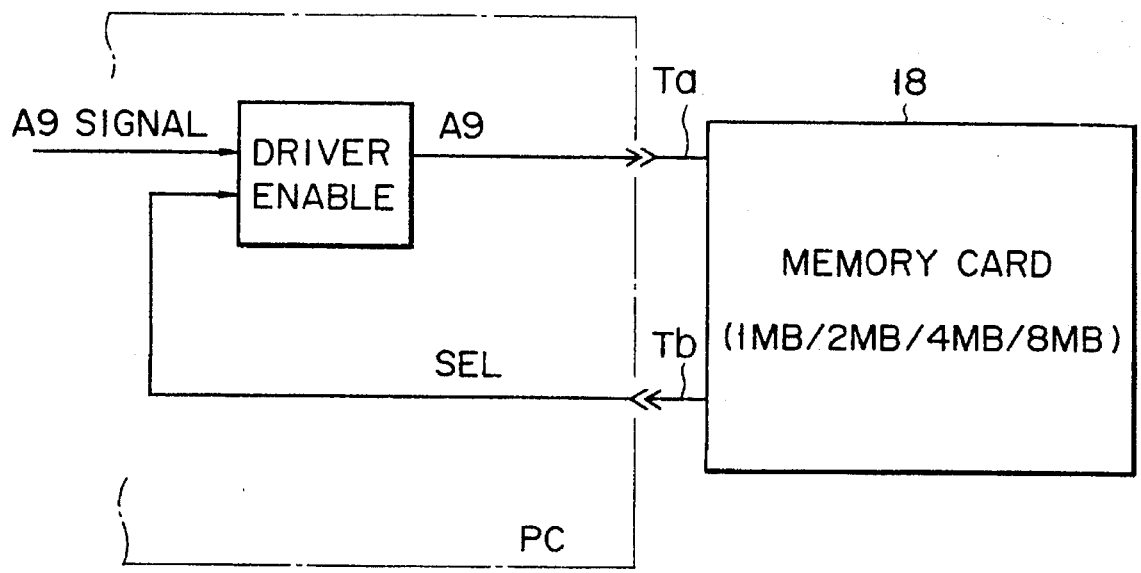
F I G. 9
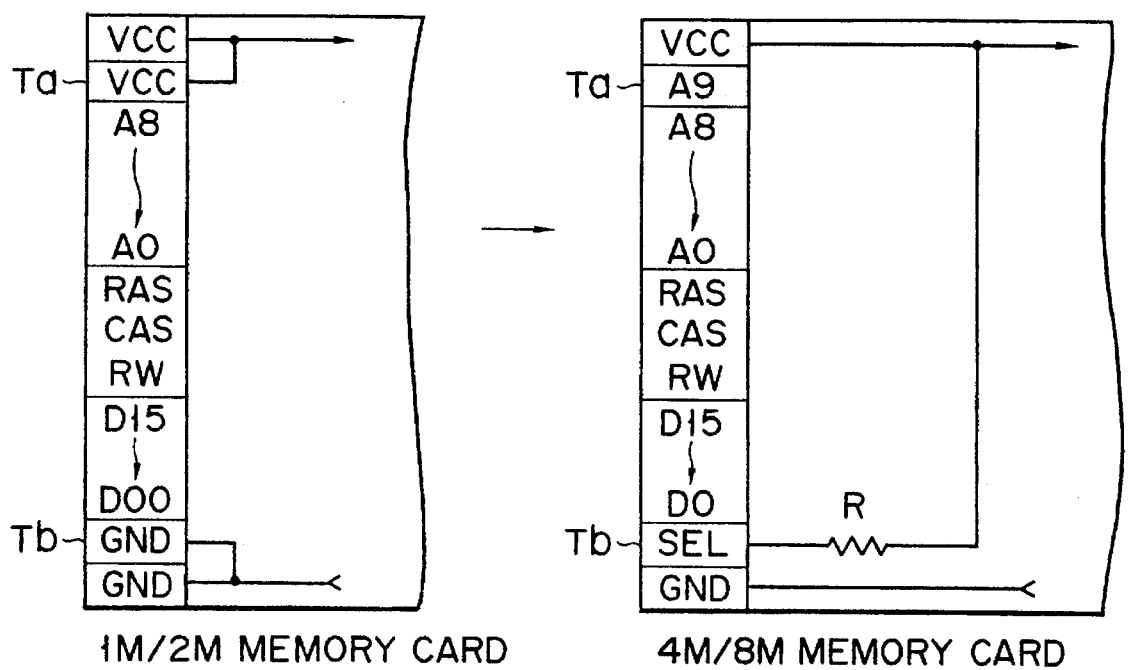
F I G. 10A  F I G. 10B

Remaining Battery capacity
 <LEFT> : E ??? F  <RIGHT> : E ??? F
 Speaker : ON OFF  Mode : RESUME BOOT
 Audible Battery Warning : ON OFF E  ???    F ··· BATTERY MOUNT INITIAL STATE
E  N/A    F ··· BATTERY UNMOUNTED STATE
E  ▶▶▷▷   F ··· BATTERY RESIDUAL CAPACITY
                DISPLAY

PORTABLE COMPUTER POWERED BY RECHARGEABLE BATTERIES

This application is a continuation of application Ser. No. 07/718,359, filed Jun. 24, 1991, now abandoned.

BACKGROUND OF THE INVENTION

1. Field of the Invention

This invention relates to a portable computer powered by rechargeable batteries, and more particularly to the method of charging and switching individual batteries and indicating battery state in a portable computer.

2. Description of the Related Art

Computers powered by detachable batteries have been developed. In this type of computer, the operator cannot tell whether or not batteries are in the computer unless he checks the battery compartment. Thus, an operator may be unaware that only one battery is in a battery compartment that can hold more than one battery. The single battery will then run short earlier than expected, during operation, so that the computer is forced to stop operation half way. Such mishaps tend to occur with portable computers often powered by batteries only, such as lap-top computers or book-type (note-type) computers. These disadvantages of conventional portable computers prevent users from making full use of the easy-to-carry feature.

Computers with a low-battery indicator are also available. For rechargeable batteries, however, the low-battery indication cannot tell exactly the state of the battery. Further, it is impossible to predict the remaining battery capacity, the available computer operation time, and other factors unless it is known whether the batteries are fully charged or still being charged. Conventionally, however, there were no such computers that automatically detected the charged/discharged state of the rechargeable batteries, and then informed the operator of the results. Exact information on the charged/discharged state is very helpful in making full use of the features of portable computers often powered by batteries only.

SUMMARY OF THE INVENTION

Accordingly, an object of the present invention is to provide a computer capable of being powered by batteries which is easy to use.

Another object of the present invention is to provide an easy-to-carry portable computer capable of being powered by detachable rechargeable batteries for a long-time operation, and of providing the operator with proper information on the charged/discharged state of the individual batteries and their installation, with a view to allowing full use of the easy-to-carry feature.

Still another object of the present invention is to provide a portable computer capable of being operated from a plurality of batteries, which informs the operator of the charged/discharged state of each battery to prevent problems including power shortage during operation, with the aim of allowing full use of the computer's portability.

Still another object of the present invention is to provide a portable computer capable of being operated from a plurality of detachable batteries, which informs the operator whether or not the individual batteries are in place for easy battery installation check to avoid problems including power shortage during operation, for the purpose of enabling full use of the computer's portability.

The foregoing objects are accomplished by a portable computer powered by batteries, comprising: a first rechargeable battery; a second rechargeable battery; operating power generating means for selecting one of the first and second rechargeable batteries and for generating operating power from the output power from the selected first or second battery; data processing means for performing data processing by using the operating power from the operating power generating means; checking means for checking the first and second batteries for discharged state; charging means for charging the battery when the checking means judges that the first or second battery is in a discharged state that needs charging; and informing means for informing the operator of three states of the first and second batteries, the three states indicating need of charging, during charging, and completion of charging.

with the above arrangement, this invention makes it possible to judge without difficulty that the individual batteries are fully charged, still being charged, or need charging, which allows the operator to take proper measures if necessary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an embodiment of a personal computer according to the present invention;

FIGS. 5A and 5B are views for explaining display contents of a state display unit in accordance with charge control shown in FIG. 3;

FIGS. 6A, 6B and 6C are views for explaining display contents of the state display unit in accordance with battery-driven control shown in FIGS. 4A, 4B 4C;

FIGS. 9, 10A and 10B are views for explaining an interface mechanism of a memory card used as an extension RAM in the above embodiment;

FIG. 14 is a view showing a bottom-up menu for displaying a battery state in the above embodiment.

DETAILED DESCRIPTION OF THE PREFERRED EMBODIMENTS

Figure 2:
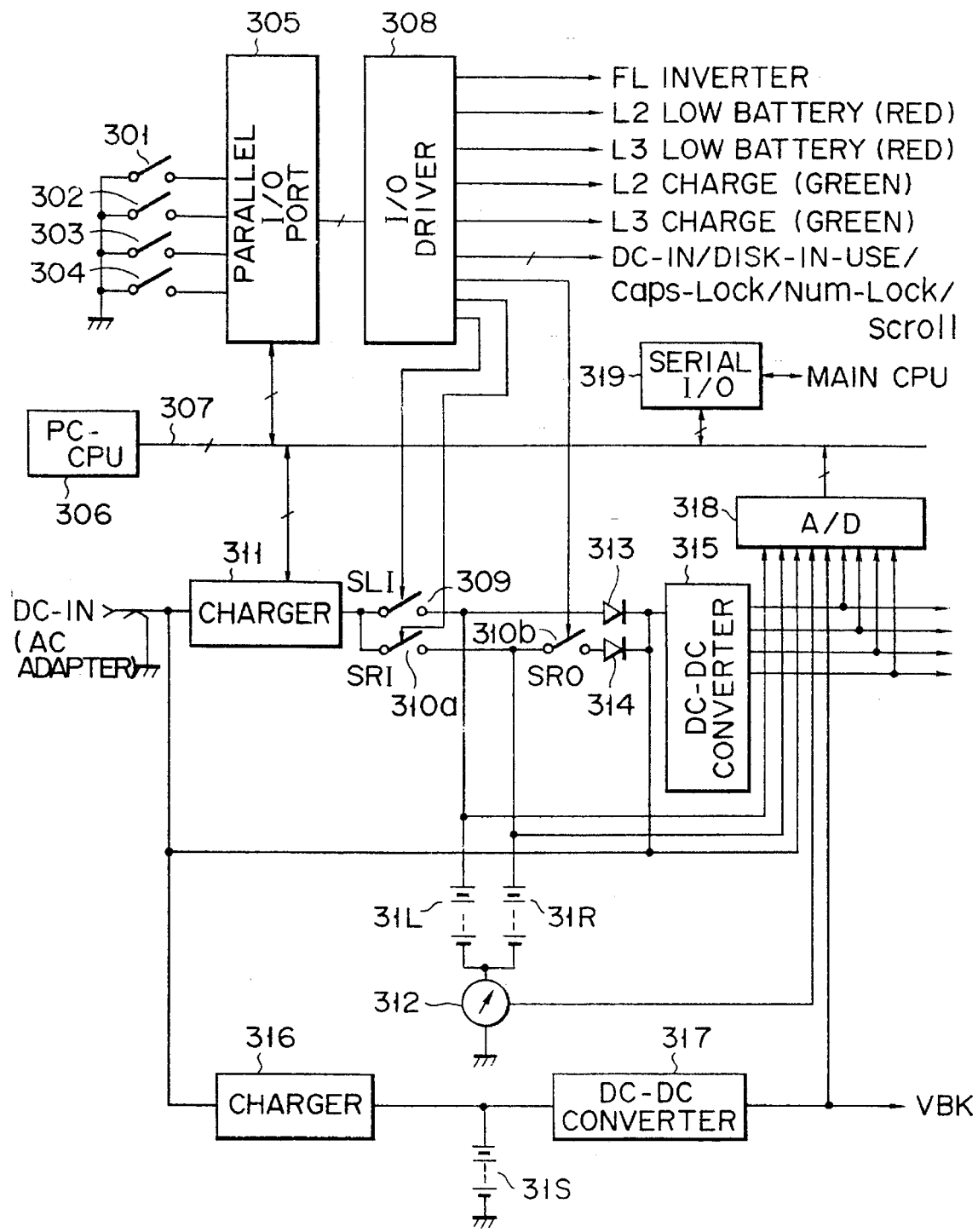
FIG. 2 is a block diagram showing an arrangement of a power supply circuit shown in FIG. 1.

FIG. 1 is a block diagram showing an embodiment of a personal computer according to the present invention. Referring to FIG. 1, components 11 through 30 and 40 are connected to a system bus 10. A CPU (main CPU) 11 controls the overall operation of the system. A ROM 12 stores permanent programs such as firmware. A RAM 13 serves as a main memory and stores programs and data to be processed. A direct memory access controller (DMAC) 14 performs direct memory access control. A programmable interrupt controller (PIC) 15 and a programmable interval timer (PIT) can be set by programs. A real time clock (RTC) 17 has its own operating battery. An extension RAM 18 serves as a high-capacity extension RAM to be detachably inserted in an extension RAM card slot. In this embodiment, any four types of memory cards, i.e., 4- and 8-MB new memory cards in addition to 1- and 2-MB existing memory cards, can be mounted. In this case, a common interface mechanism for the existing memory cards (1 MB and 2 MB) and the new memory cards (4 MB and 8 MB) will he described later with reference to FIGS. 9 and 10.

A backup RAM 19 serves as a data storage area realizing a resume function and is powered by a backup power source (VBK). A floppy disk controller (FDC) 20 is arranged to control two floppy disk drives FDD(1) 32A and FDD(2) 32B. However, for example, a 2.5" hard disk may be mounted in place of the FDD(2) 32B, and the system can be easily up-graded. In this case, a means for replacing the FDD+FDD arrangement with the HDD+FDD arrangement will be described later with reference to FIGS. 11 through 13D.

A printer controller (PRT-CONT) 21 is selectively connected to a 5" external floppy disk drive 33 or a printer 34 through a connector. An input/output interface (Universal Asynchronous Receiver/Transmitter: UART) 22 is connected to an RS-232C interface 35 or the like as needed. A keyboard controller (KBC) 23 controls inputs to a keyboard 36 integrally arranged with an apparatus main body having a CPU board therein. A display controller (DISP-CONT) 24 drives an LCD 37 with a side light consisting of an FL (fluorescent light) cold cathode ray tube. However, the DISP-CONT 24 may control a CRT display unit as an external display. A video RAM (VRAM) 25 is powered by the backup power (VBK) and stores video data. A kanji ROM 26 stores kanji character patterns corresponding to kanji character codes. A dictionary ROM 27 stores a kana/kanji conversion dictionary.

A power supply control interface (PS-IF) 28 is arranged to connect a power supply circuit (FIG. 2) 30 to the CPU 11 through the system bus 10. In this embodiment, the PS-IF 28 has a serial-parallel conversion function for performing data transfer by means of a serial interface between the power supply circuit 30 and the power control CPU 306 in this embodiment. A power supply adapter (to be referred to as an AC adapter) 29 is plug-in connected to the personal computer main body and rectifies and smoothes a commercial AC power (AC) to obtain a DC operating power having a predetermined potential. An intelligent power supply (to be referred to as a power supply circuit hereinafter) has a power control CPU (PC-CPU) and has an arrangement to be described with reference to FIG. 2.

Main batteries (M-BATA and M-BATB) 31L and 31R are detachable from the apparatus main body (PC main body) and are respectively constituted by rechargeable batteries. In this embodiment, during an operation, one of the batteries is selected as a target object (target power supply object) under the control of the power supply circuit 30. When the selected battery is discharged to a use limit, the target power supply object is switched, and the other battery serves as a target power supply object. In this embodiment, of the pair of main batteries (M-BATA and M-BATB) 31L and 31R, the battery (M-BATA) 31L is called a left main battery (L-battery), and the battery (M-BATB) 31R is called a right main battery (R-battery). The main batteries 31L and 31R having different capacities (i.e., 2200-mA type and 1700 mA type), and one of the batteries can be arbitrarily used. A charge control processing means for these main batteries 31L and 31R will be described with reference to FIG. 3, and a selecting/switching processing means including a battery check during operation with a battery will be described later with reference to FIGS. 4A through 4C. The charge control state display will be described later with reference to FIGS. 5A and 5B, and the battery use state display and the state transition display will be described with reference to FIG. 6. At least one of the pair of main batteries (M-BATA and M-BATB) 31L and 31R is used as a detachable battery, battery packs serving as main batteries have two different current capacities, and any one of the battery packs can be mounted. Under these conditions, a mounted battery pack type determining mechanism and a charge processing means based on the determined battery type will be described later with reference to FIGS. 7A through 8.

A sub-battery (S-BAT) 31S is a rechargeable built-in battery which supplies backup power (VBK) required for backing up the RAM 13, the extension RAM 18, and the video RAM 25.

An extension bus connector 40 is an extension bus connector (EBC) for extending the functions. The EBC 40 is selectively connected to, e.g., an external hard disk (external HDD) as needed, or to any other extension unit having a function extension component (e.g., a keyboard, a CRT display, a high-capacity memory, and a personal computer mounting mechanism) to form a circuit.

A built-in HDD interface (HDD-IF) 41 interfaces a built-in HDD (with HDC) when the system is up-graded to an HDD mounted type (i.e., one HDD and one FDD are mounted). More specifically, when the system is to be up-graded, a built-in HDD is connected through a connector 42 in place of the floppy disk drive (FDD(2)) 32B. A means for up-grading the system from the FDD+FDD type having two floppy disk drives (FDD(1) and FDD(2)) 32A and 32B to the HDD+FDD arrangement consisting of one 2.5" hard disk (HDD) and a 3.5" floppy disk drive will be described with reference to FIGS. 11 through 13D.

A state display unit 50 includes a plurality of state display LEDs (L1 to L9) driven under the control of the power control CPU 306 in the power supply circuit 30, and the details of this state display unit are shown in FIGS. 5A through 6C.

FIG. 2 is a block diagram showing an arrangement of the power supply circuit 30. The power supply circuit 30 includes a power switch 301, a reset switch 302, and a display switch 303. A switch 304 is used to set the capacity (2200-mA type or 1700-mA type) of the main battery (31L/31R) and is turned on to use the main battery (31L or 31R) having a larger capacity (2200 mA). A method of setting this switch 304 will be described in detail with reference to FIGS. 7A through 7C. A parallel I/O port 305 holds states of the switches 301, 302, 303, and 304 and setup information of the power control CPU 306 (to be described in detail later).

The power control CPU (PC-CPU) 306 concentratedly manages the power supply of the overall apparatus. More specifically, the CPU 306 receives data of the respective components of the power supply circuit 30 instruction data of the CPU 11 through the internal bus 307 and controls power supply to the respective components in the apparatus in accordance with the instructions, internal states, and external operation states. The power control CPU 306 has a power supply control processing function including charge control of the left and right main batteries (M-BATA and M-BATB) 31L and 31R by using charge setup data (charge control parameter) shown in the flow chart of FIG. 3 and battery drive control in accordance with the flow charts in FIGS. 4A through 4C.

An I/O driver 308 controls FL (fluorescent light) of the LCD 37 under the control of the power control CPU 306 and drives the LEDs (L1 through L9) of the state display unit 50.

As shown in FIGS. 5A and 5B and FIGS. 6A through 6C, the state display unit 50 includes nine LEDs (L1 through L9) including an LED (L1) for displaying a power ON state and operating speed set state, a state display LED (L2) for the left main battery 31L, a state display LED (L3) for the right main battery 31R, an AC adapter connecting state display LED (L4), a use state display LED (L5) for the floppy disk drive (FDD(1)) 32A, and a use state display LED (L6) for the floppy disk drive (FDD(2)) 32B. Each LED can emit red light and green light. Red light or green light, or both the green light and the red light are selectively emitted to perform display operations in units of colors. More specifically, the LED (L1) emits green light in a high-speed clock operation in a power ON state, but emits red light in a low-speed clock operation. The LEDs (L2 and L3) flicker red light when the corresponding main batteries 31L and 31R are set in a low-battery state (i.e., a discharge state near a use limit), emit yellow light (red+green) in an abrupt charging state, and emit green light at the end of charging. The LED (L4) emits red light in an effective connecting state of the AC adapter 29 and flickers red light in the effective connecting state of the AC adapter 29 in an abnormal state of the power supply circuit 30.

A main battery switch (SL1) 309 is inserted in a current path of the left main battery 31L and is ON/OFF-controlled by an output from the I/O driver 308 controlled by the power control CPU 306. Main battery switches (SR1 and SR0) 310a and 310b are inserted in a current supply path and a current output path of the right main battery 31R, respectively, and is ON/OFF-controlled by an output from the I/O driver 308. A charge unit 311 charges main batteries 31L and 31R under the control of the power control CPU 306. A current detector 312 detects output currents from the main batteries 31L and 31R. Diodes 313 and 314 serve as reverse flow preventive diodes inserted in the current output paths of the main batteries (M-BATA and M-BATB) 31L and 31R. A DC—DC converter 315 generates operating powers for the respective components of the apparatus from the power source of the left main battery (M-BATA) through the main battery switch 309 or the right main battery (M-BATB) 31R through the main battery switches 310a and 310b. A charge unit 316 charges the sub-battery (S-BAT) 31S. A DC—DC converter 317 obtains a backup power (VBK) from a power supply of the sub-battery (S-BAT). The backup power is supplied from the sub-battery (S-BAT) 31S to prevent ensure of the contents of the backup RAM 19. An A/D converter 318 supplies a detection current value of the current detector 312, the output voltages from the main batteries 31L and 31R, and the output voltages from the DC—DC converters 315 and 317 to the power control CPU 306 as digital data. A serial I/O 319 exchanges data between the power control CPU 306 and the main CPU 11. More specifically, the I/O 319 converts data from the power control CPU 306 into serial data and supplies the digital data to the power supply control interface (PS-IF) 28. This serial data is reconverted into parallel data by the power supply control interface (PS-IF), and the parallel data is sent to the main CPU 11.

Figure 3:
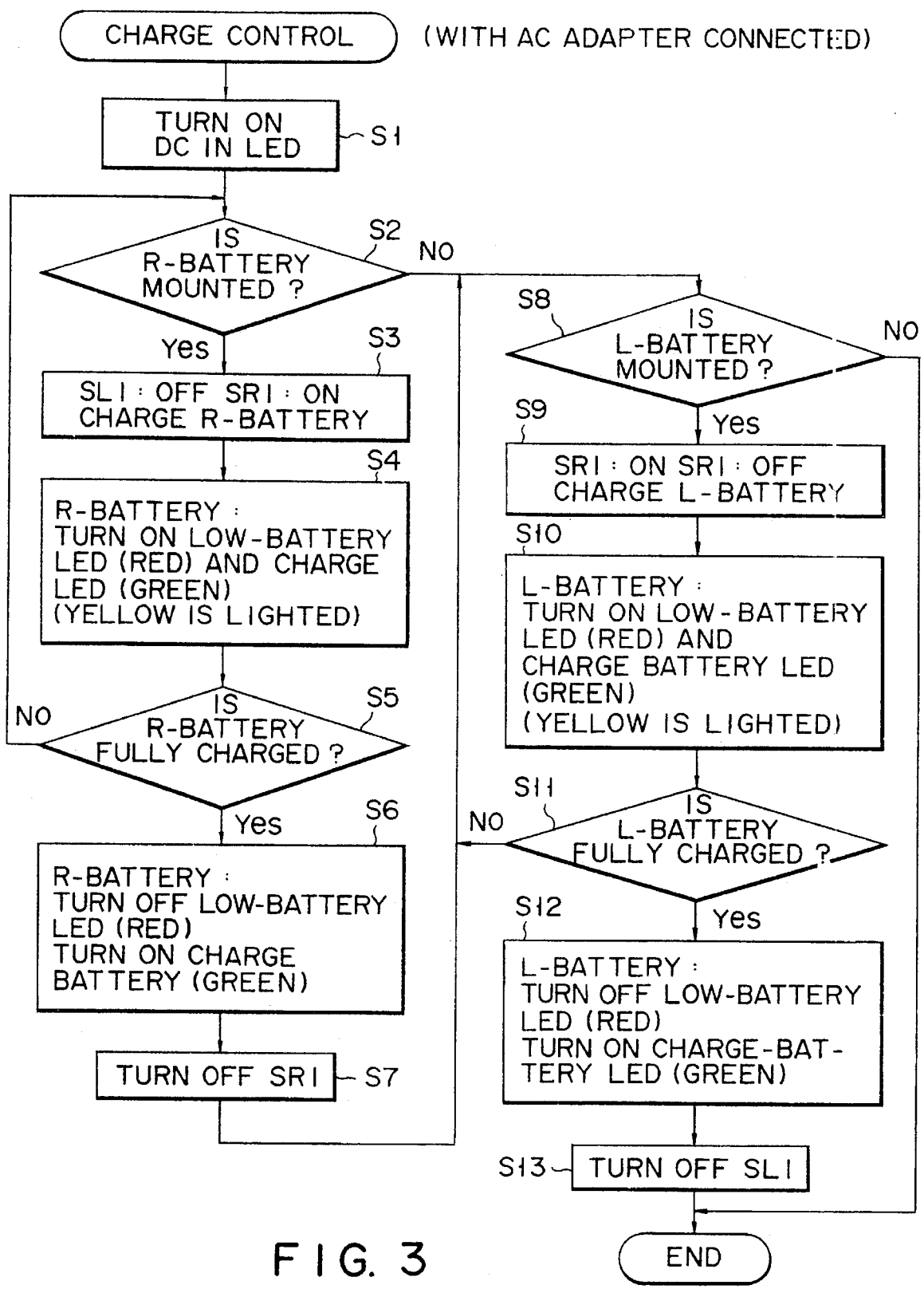
FIG. 3 is a flow chart of a charge control routine executed by a power control CPU 306 shown in FIG. 2.
Figure 4A:
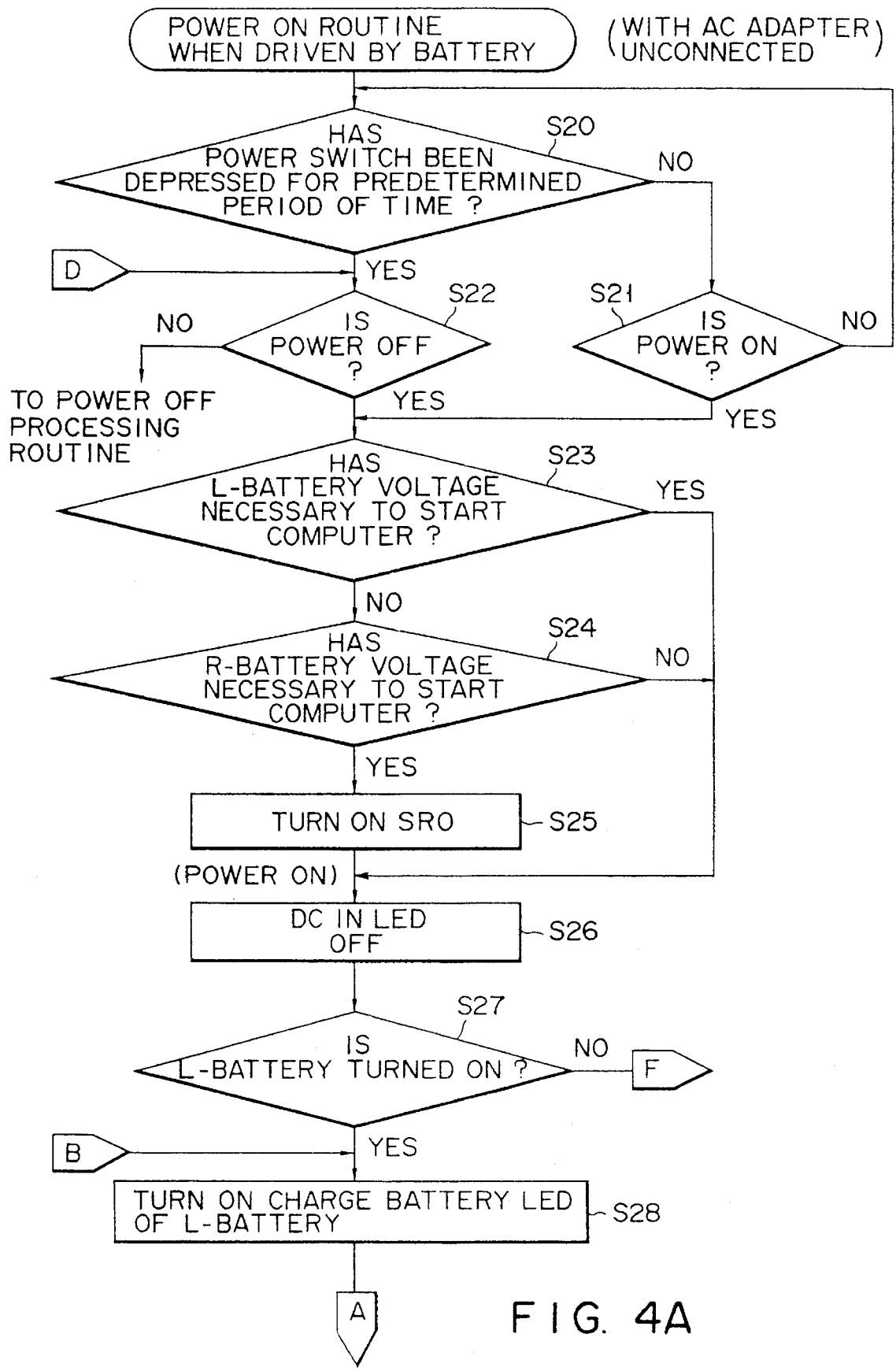
FIGS. 4A, 4B and 4C are flow charts of a battery-driven power-on routine executed by the power control CPU 306 shown in FIG. 2.
Figure 4B:
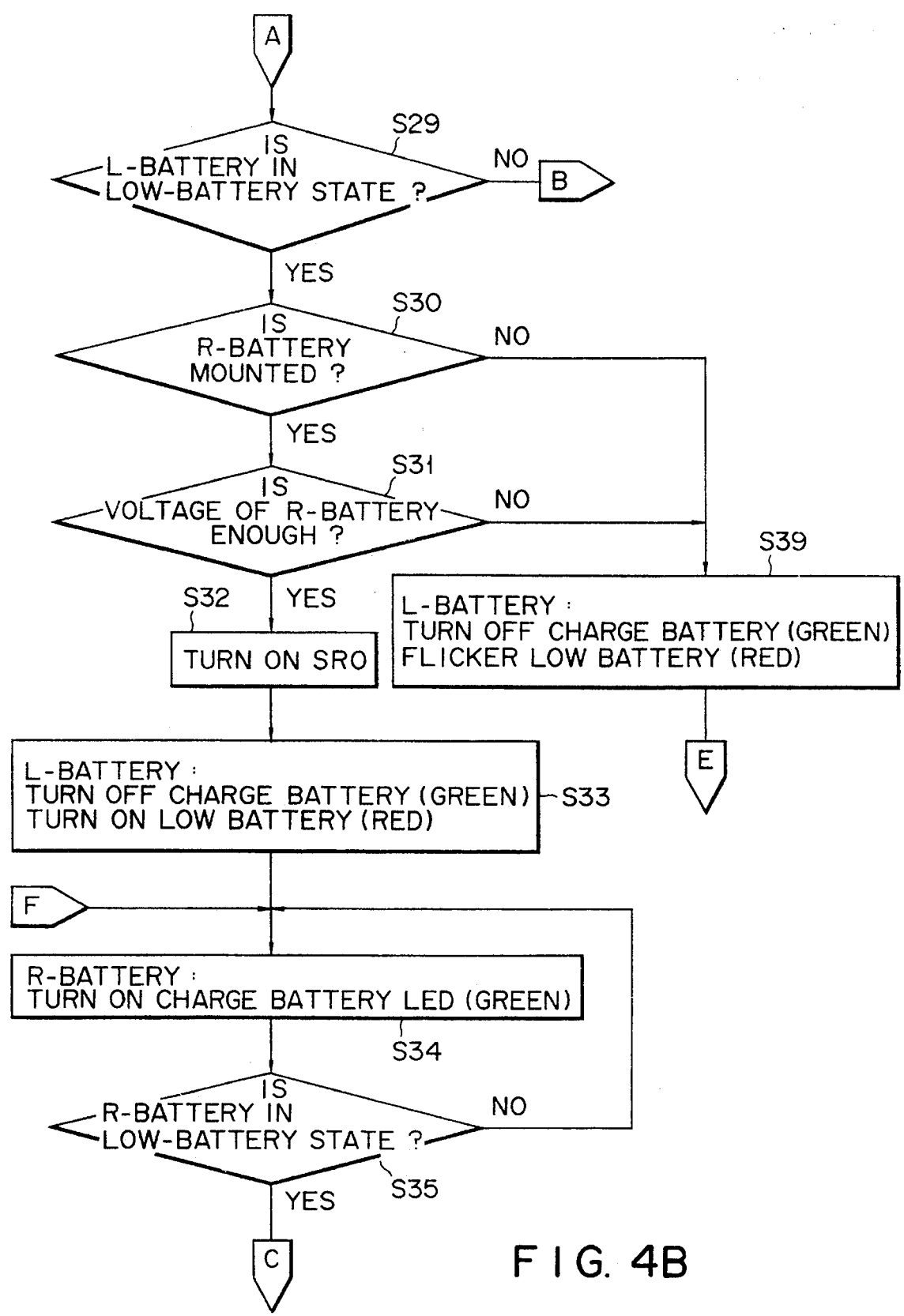
Figure 4C:
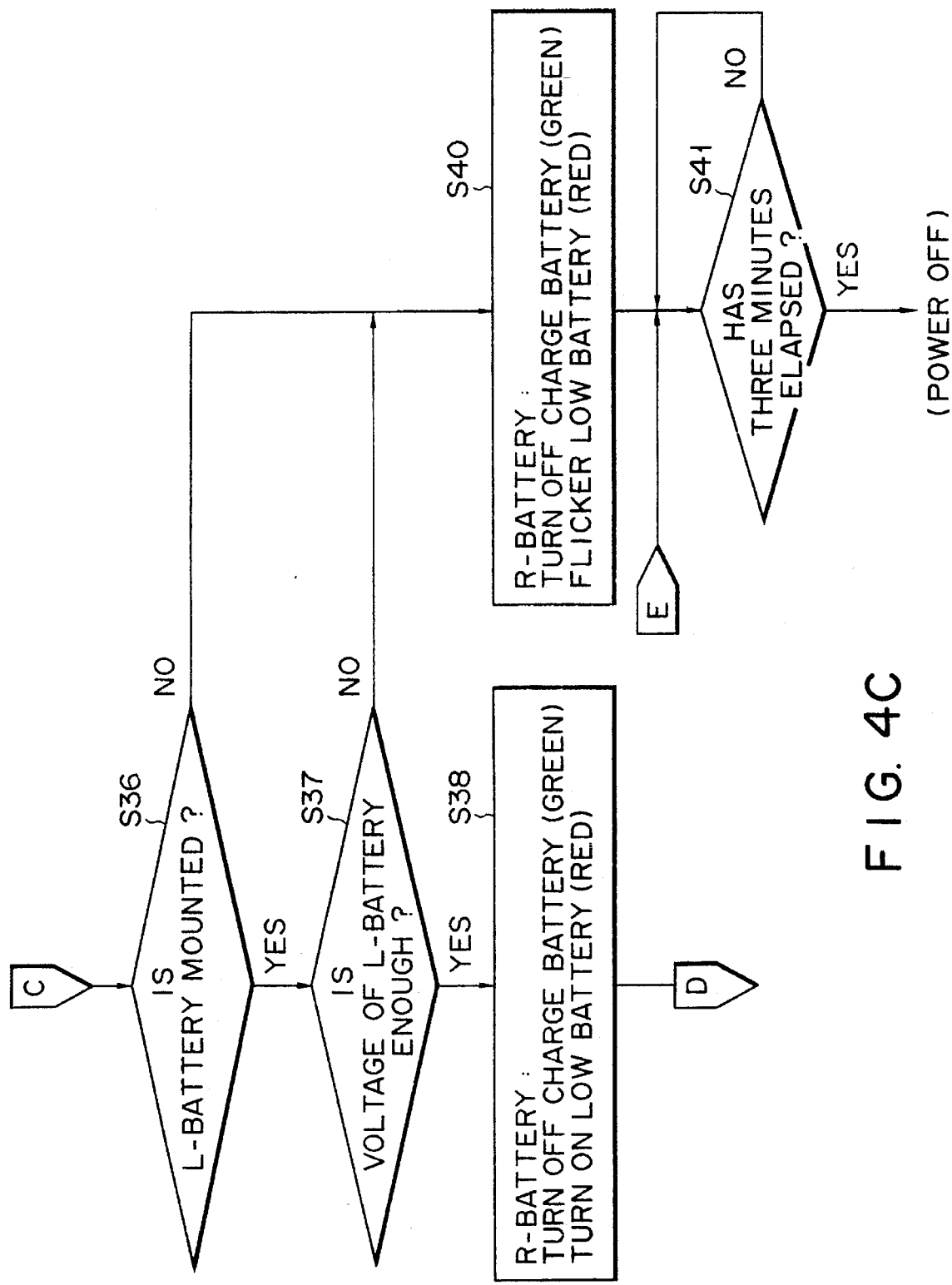

FIGS. 3 and 4A through 4C are flow charts showing processing of the power control CPU 306. FIG. 3 is a flow chart showing a charge control routine in the embodiment of the present invention under the control of the power control CPU 306. This charge control processing is repeatedly performed every predetermined time interval (e.g.. 64 msec) when the power control CPU 306 detects the connecting state of the AC adapter 29 through the A/D converter 318. FIGS. 4A through 4C are flow charts showing power ON processing routine when the apparatus is driven by a battery (i.e., an operation performed when the AC adapter is not connected) under the control of the power control CPU 306. This power ON processing routine is repeated every predetermined time interval in a battery-driven power ON state.

FIGS. 5A and 5B are views showing display contents of the state display unit 50 in association with charge control shown in FIG. 3. A relationship between the display contents and display colors of the state display LED (L2) for the left main battery 31I, the state display LED (L3) for the right main battery 31R, and the AC adapter connecting state display LED (L4) under the charge control in which an external power is supplied from an AC adapter is shown in FIGS. 5A and 5B.

FIGS. 6A through 6C are views showing display contents of the state display unit 50 in association with battery-driven control shown in FIGS. 4A through 4C. These display contents of use states and state transition states are those of the LEDs (L2 through L4) which are obtained when an external power is not supplied from the AC adapter and one of the main batteries 31L and 31R is selected to obtain a battery-driven state. In this embodiment, the right main battery is preferentially used. However, when the right main battery is set in a low-battery state or when the right main battery is not mounted, the left main battery is used.

Figure 7A:
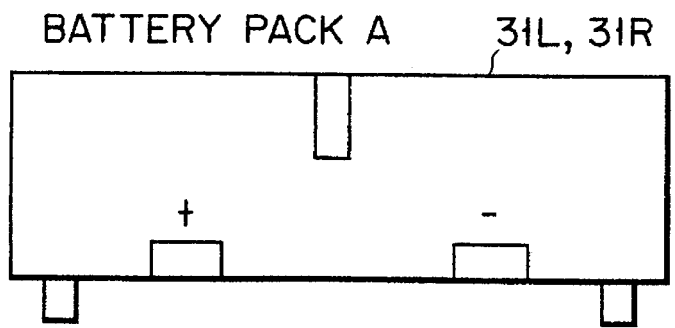
FIGS. 7A, 7B and 7C are views for explaining a type determination mechanism of a mounted battery pack.
Figure 7B:
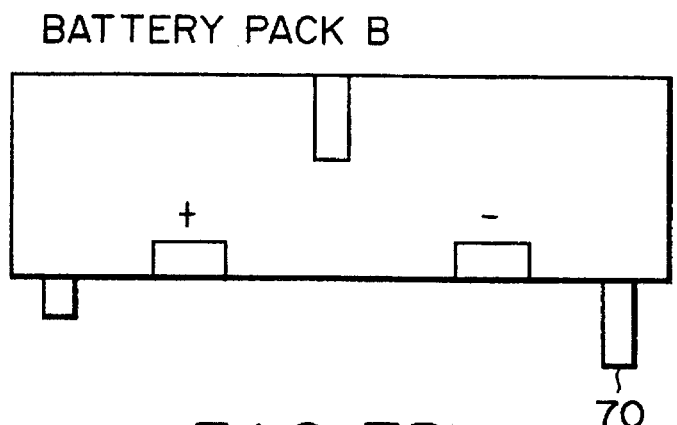
Figure 7C:
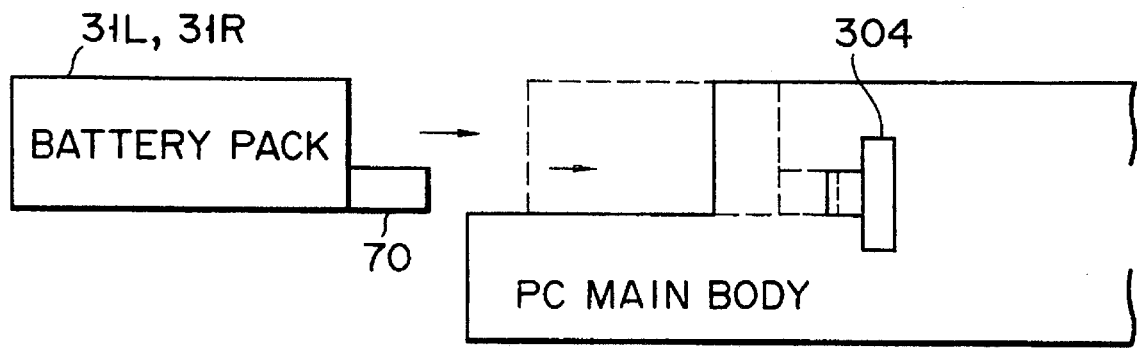
Figure 8:
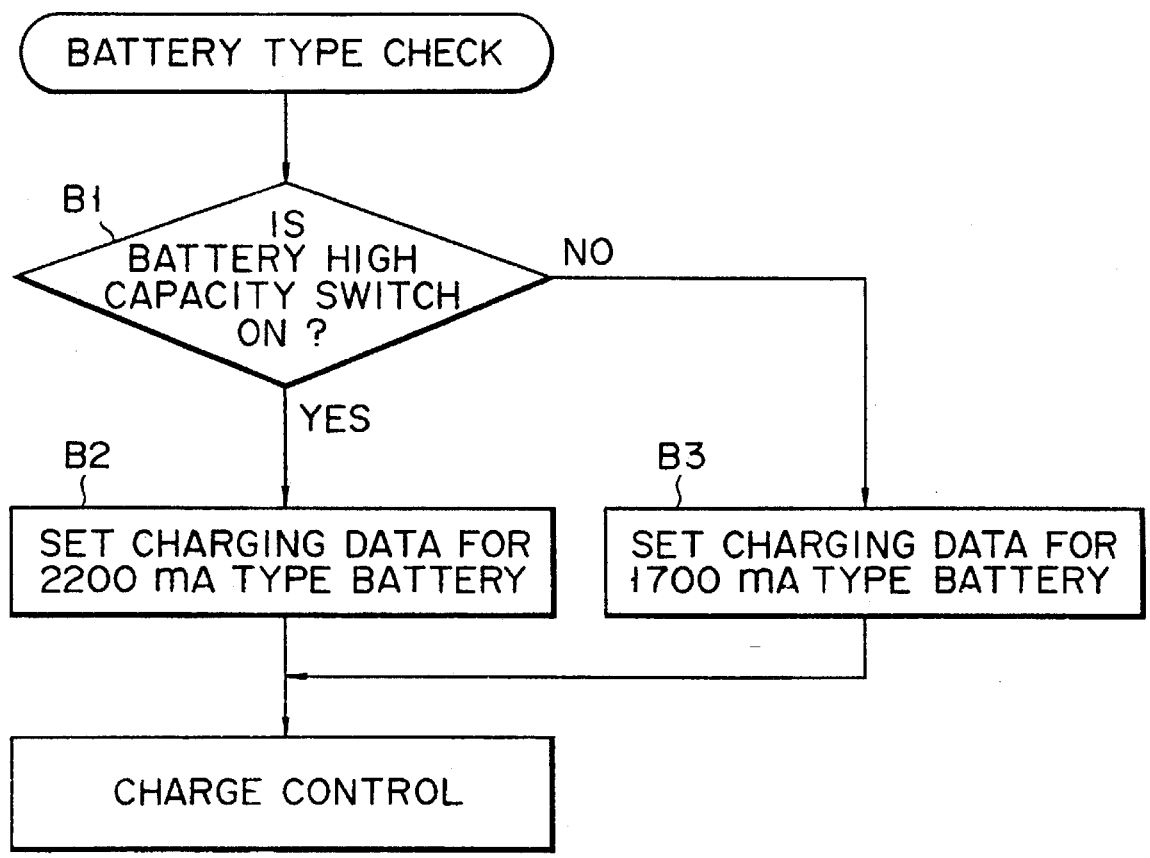
FIG. 8 is a flow chart showing a processing sequence of the power control CPU on the basis of the type determination in FIG. 7.
Figure 11:
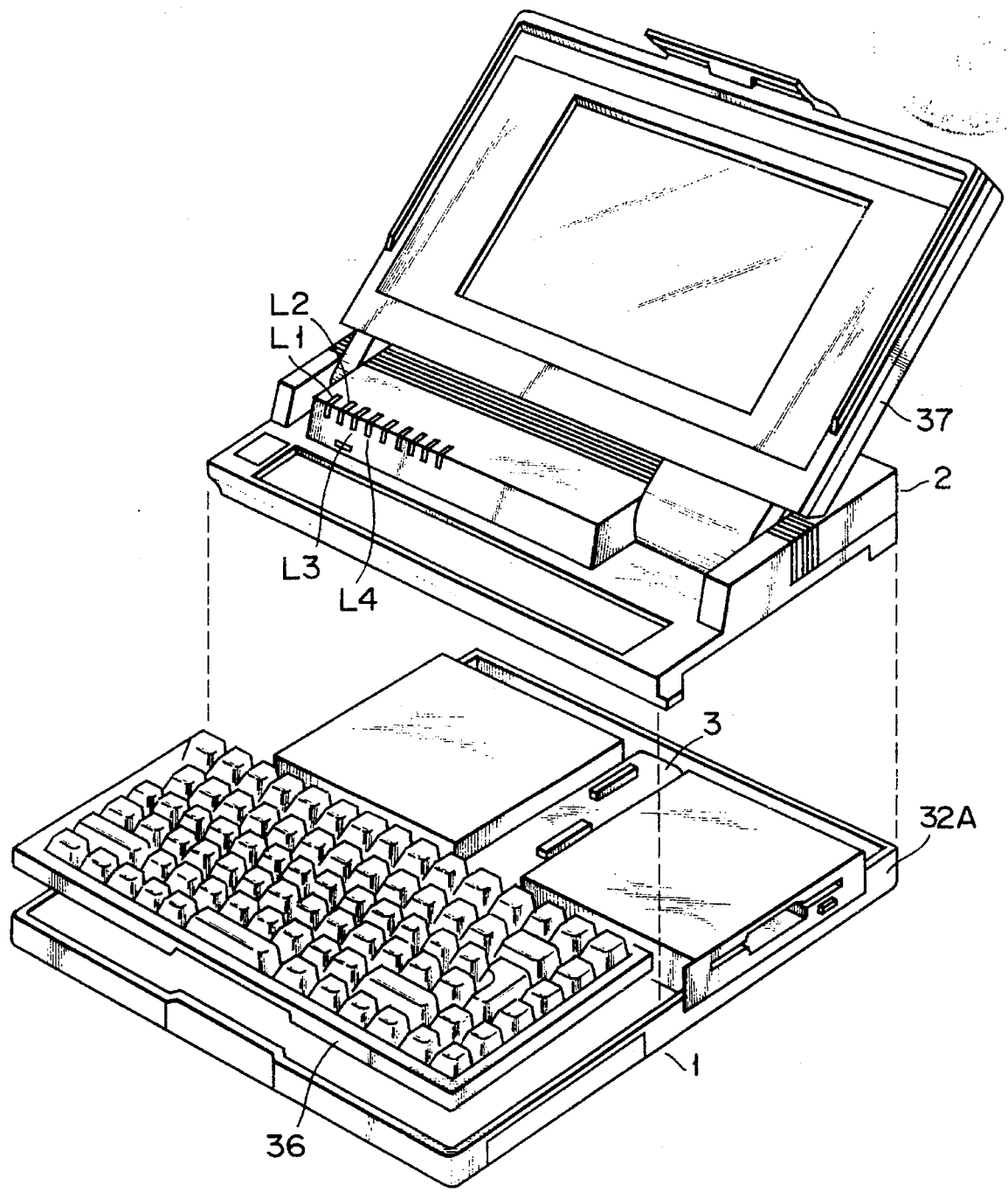
FIGS. 11 and 12 and FIGS. 13A, 13B, 13C and 13D are views for explaining a system grade-up means using a built-in HDD interface (HDD-IF) in the above embodiment.
Figure 12:
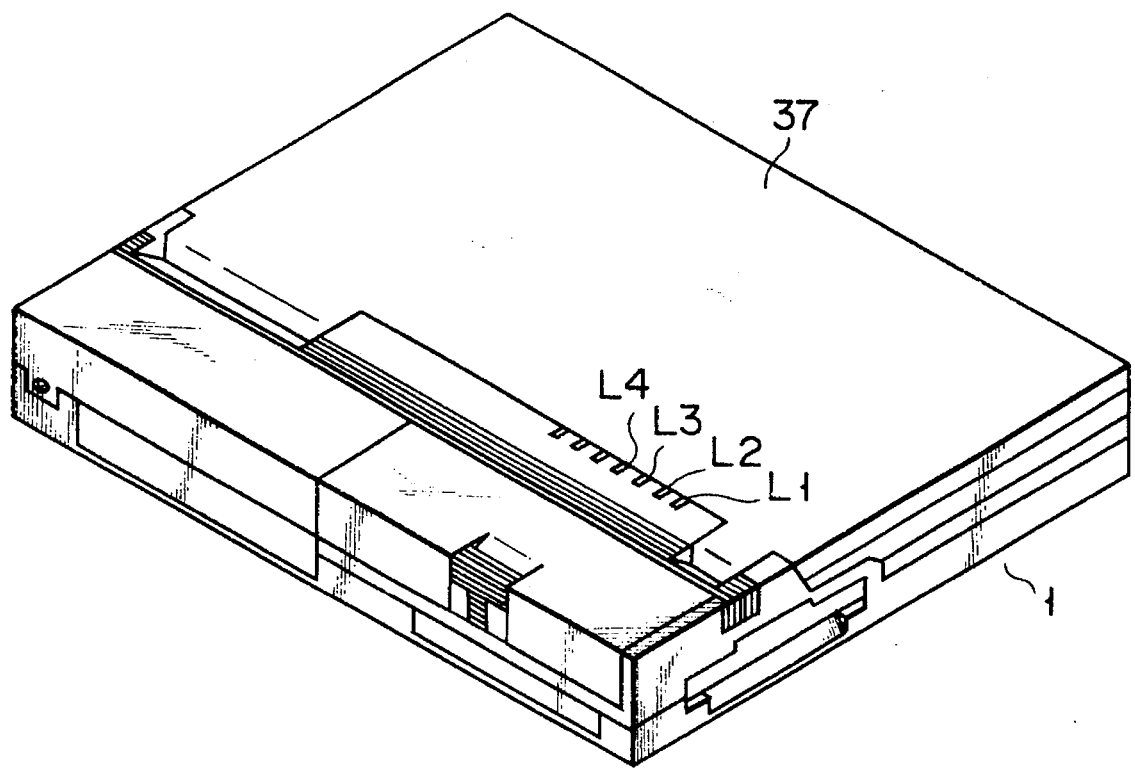

In this embodiment, one of the main batteries 31L and 31R is semi-fixed by a screw (in this case, the left main battery 31L), the right main battery 31R is slidably detachable by a slidable mounting means, and battery packs having two different current capacities (2200-mA high-capacity type and 1700-mA low-capacity type) can be arbitrarily used. FIGS. 7A through 7C explain a type (capacity type) determination mechanism of the detachable battery pack (right main battery 31R). FIG. 8 shows a set data (charge control parameter) switching processing flow of the power control CPU 306 by using a battery capacity switch 304. In this case, the switch 304 is used to set the capacity of the semi-fixed battery pack (left main battery 31L).

As mentioned above, in this embodiment, of the pair of main batteries (M-BATA and M-BATB) 31L and 31R, one main battery (in this embodiment, the left main battery 31L) is semi-fixed by a screw, and the other battery (i.e., the right main battery 31R) is arbitrarily detachable by the sliding mounting means. As shown in FIGS. 7A and 7B, the main batteries 31L and 31R are constituted by battery packs having two different current capacities (2200-mA high-capacity type and 1700-mA low-capacity type). The charge control for the main batteries 31L and 31R is performed on the basis of the setup data (charge control parameter) under the control of the power control CPU 306. In order to arbitrarily use the battery packs having two different current capacities, charge control must be performed on the basis of the setup data (charge control parameter) corresponding to the capacity types of the mounted battery packs. In this embodiment, the battery capacity switch 304 is operated to set a capacity type of a mounted battery pack as the battery pack semi-fixed by a screw, i.e., the left main battery 31L in accordance with the capacity type of the mounted battery pack. A setup data (charge control parameter) switching processing means of the power control CPU 306 on the basis of the battery high capacity switch 304 is shown in the flow chart of FIG. 8. The capacity type of the mounted battery pack is automatically detected and the setup data (charge control parameter) is automatically switched for the battery pack arbitrarily detachable by the sliding mounting means, i.e., the right main battery 31R. More specifically, in the battery pack used as the right main battery 31R, a switch operation projection 70 is formed at a distal end portion at a predetermined position in a mounting direction (i.e., a direction of an arrow in FIG. 7B) in the 1700 mA low-capacity type battery pack. When the battery pack is mounted in the apparatus main body (PC main body), the switch 304 is turned on by the projection 70. The power control CPU 306 determines the capacity type of the mounted battery pack on the basis of the signal from the switch 304. The power control CPU 306 performs charge current control of the battery pack as the right main battery 31R by using setup data (charge control parameter) corresponding to the detected capacity type.

FIGS. 9 through 10B are views for explaining a common interface mechanism for the existing 1- and 2-MB memory cards and the new memory cards (4 MB and 8 MB) mounted in place of only the existing memory cards (1 MB and 2 MB). Of the predetermined number of pins (e.g., 40 pins), one power supply pin and one ground pin (two pins) of each of the memory cards (1 MB and 2 MB), and one (Ta) of the omitted pins is assigned to an increase in address of the new memory cards (4 MB and 8 MB), and the remaining pin (Tb) is assigned to the card determination. When a signal (SEL) at a terminal Tb is set at high level (SEL="1"), a logic gate array for controlling the output of the incremented address (A9: the most significant bits of the 4- and 8-MB cards) is connected to the terminal Ta of the mounted memory card (4- or 8-MB new memory card).

Figure 13A:
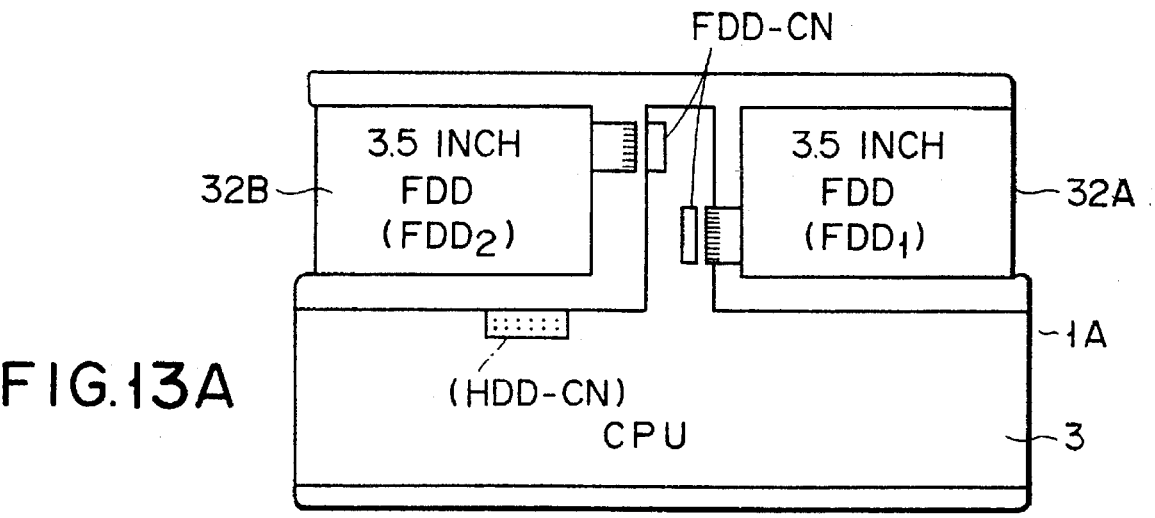
Figure 13B:
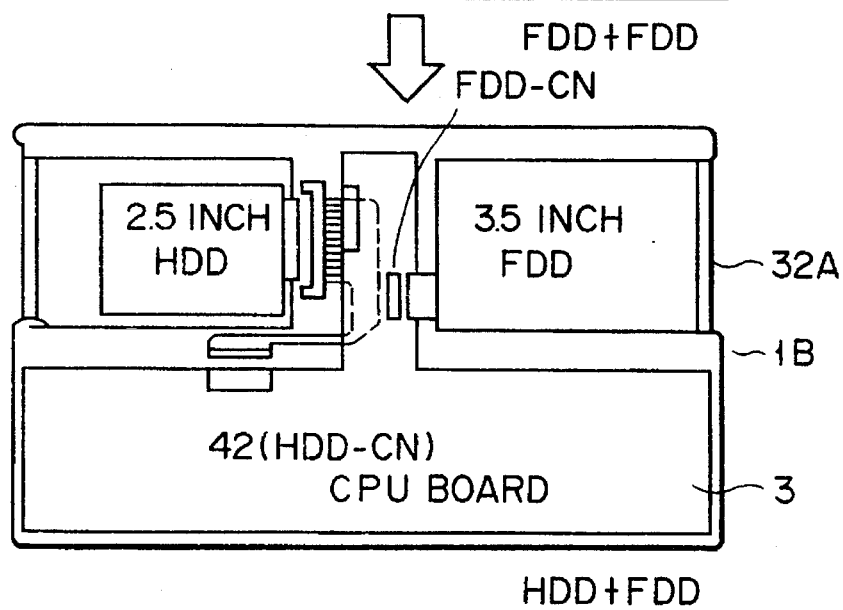
Figure 13C:
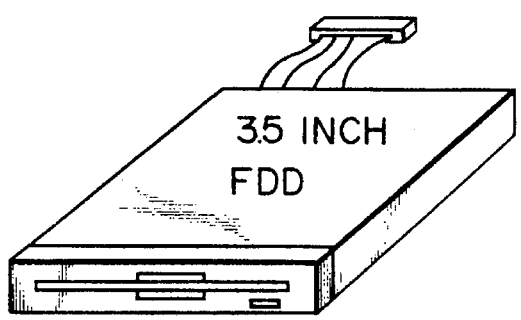
Figure 13D:
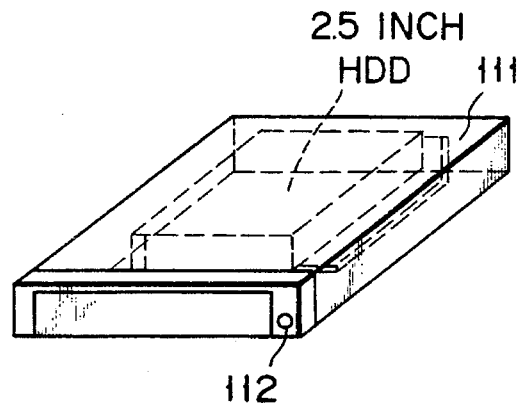

FIGS. 11 through 13D are views for explaining a means for up-grading the system from the FDD+FDD type consisting of the two floppy disk drives (FDD(1) 32A and FDD(2) 32B) to the HDD+FDD type consisting of the 2.5" hard disk (HDD) and the 3.5" floppy disk drive, by using the built-in HDD interface (HDD-IF) 41. A CPU board 3, a keyboard 36, and the like are mounted on a base housing 1 of the personal computer main body (PC main body). An FDD+FDD type base housing (FIG. 13A) 1A having the two floppy disk drives (FDD(1) 32A and FDD(2) 32B) therein and an HDD+FDD type base housing (FIG. 13B) 1B having the 2.5" hand disk (HDD) and the 3.5" floppy disk drive are prepared. The base housing 1A (FIG. 13A) is replaced with the base housing 1B (FIG. 13B) and the mounted hard disk is connected through a built in HDD interface (HDD-IF) 41, thereby easily up-grading the system to the HDD+FDD type system. In this case, as shown in FIGS. 13C and 13D, the 2.5" hard disk (HDD) is housed in the same type of housing as that of the 3.5" floppy disk drive and is placed on a detachable tray 111. Upon operation of an eject button 112, the 2.5" hard disk can be placed on the detachable tray 111 or ejected therefrom.

FIG. 14 is a view showing a pop-up menu for a battery state display. In this embodiment, upon simultaneously depression of a specific key such as a function key and an escape key, a battery state is displayed on part of the screen. In this case, in display areas (<LEFT>E••F and <RIGHT>E••F) for the left and right main batteries (M-BATA and M-BATB) 31L and 31R, when the batteries are not mounted, "N/A" is displayed. A battery mounted state (i.e., a state prior to charging) is displayed as "???". When charging of the battery is started, the present battery capacity is displayed with triangular marks (a maximum of seven triangle marks) in place of the battery mounted state "???".

An operation of the embodiment having the above arrangement according to the present invention will be described with reference to each drawings.

The power control CPU 306 in the power supply circuit 30 always monitors the operating state of the power switch 301. That is, the power control CPU 306 performs the power supply control processing routine regardless of the ON/OFF state of the power supply apparatus. In an operation using the AC adapter (in a power ON state), the power control CPU 306 performs a charge control routine (FIG. 3) including charge processing using the charge control data (charge control parameter) based on setup at the battery capacity switch 304. In a battery-driven state wherein the AC adapter is not connected, a power ON processing routine shown in FIGS. 4A through 4C is performed.

In the power off state of the apparatus, when the power switch 301 is operated, its switching state is held in the parallel I/O port 305. This state is fetched at a predetermined processing timing by the power control CPU 306, thereby detecting that the power switch 301 has been operated. The operation of the power switch 301 is detected every period, and a counter is updated every cycle. When the updated count reaches a predetermined value, the power control CPU 306 determines that the power switch 301 is turned on to power the apparatus.

An operation (power ON state) using the AC adapter will be performed in accordance with the charge control routine shown in FIG. 3.

In this case, an external operation power (DC IN) is supplied from the AC adapter 29 to the apparatus. This external power supply state is fetched by the power control CPU 306 through the A/D converter 318 and the internal bus 307 and is detected by the power control CPU 306. Under the control of the power control CPU 306, the AC adapter connecting state display LED (L4) in the state display unit 50 emits red light through the parallel I/O port 305 and the I/O driver 308, thereby displaying an effective connecting state of the AC adapter 29 by means of the LED (L4) (step S1 in FIG. 3; FIG. 5B).

When external operating power is supplied from the AC adapter 29, it is determined whether the right main battery 31R is mounted, or installed (step S1 in FIG. 3). If YES in step S1 in FIG. 3, the main battery switch (SL1) 309 is turned off, and the main battery switch (SR1) 310a is turned on. The charge unit 311 is controlled to charge the right main battery (M-BATB) 31R (step S3 in FIG. 3).

The state display LED (L3) for the right main battery 31R emits yellow (red+green) light, thereby indicating that the right main battery 31R is being charged (step S4 in FIG. 3; FIG. 5B).

When the right main battery 31R is fully charged by the above charge control and the fully charged state is detected (step S5 in FIG. 3), the state display LED (L3) for the right main battery 31R emits green light (red OFF/green ON). The LED (L3) indicates that charging of the right main battery 31R has been completed (step S6 in FIG. 3; FIG. 5B).

When charging of the right main battery 31R is completed, the main battery switch (SR1) 310a is turned off (step S7 in FIG. 3).

When it is determined that the right main battery (M-BATB) 31R is not mounted in step S2 in FIG. 3, it is then determined whether the left main battery 31L is mounted, or installed (step S8 in FIG. 3). If YES in step S8 in FIG. 3, the main battery switch (SL1) 309 is turned on and the main battery switch (SR1) 310a is turned off. The left main battery 31L is charged by the charge control of the charge unit 311 (step S9 in FIG. 3).

In this case, the state display LED (L2) for the left main battery 31L emits yellow (red+green) light. This LED (L2) indicates that the left main battery 31L is being charged (step S10; FIG. 5B).

During charging of the left main battery (M-BATA) 31L, the power control CPU 306 controls the charging unit 311 on the basis of the setup data (charge control parameter) based on the contents of the battery capacity switch 304 to charge the left main battery 31L at high speed in optimal conditions. This processing operation will be described later. By the above charge control, when the left main battery 31L is fully charged and this full charged state is detected (step S11 in FIG. 3), the state display LED (L2) for the left main battery 31L emits green light (red OFF/green ON). This LED (L2) indicates that charging of the left main battery 31L has been completed (step S12 in FIG. 3; FIG. 5B).

When charging of the left main battery 31L is completed, the main battery switch (SL1) 309 is turned off (step S13 in FIG. 3).

When the external operation power (DC-IN) is supplied from the AC adapter 29, charge control of the left and right main batteries 31L and 31R is performed under the control of the power control CPU 306. Therefore, an optimal charged state can always be maintained.

A power ON processing operation in a battery-driven state (operation performed when the AC adapter is not connected) will be described with reference to FIGS. 4A through 4C.

In the battery-driven state, since the AC adapter 29 is not connected, the AC adapter connecting state display LED (L4) is kept off (FIGS. 6b and 6C).

In this routine, it is determined whether the power switch 301 has been depressed for a predetermined period of time (step S20 in FIG. 4A). If YES in step S20, it is determined whether the apparatus main body is currently set in a power ON state.

If YES (i.e., power ON state) in step S22 in FIG. 4A), a power OFF routine (not shown) is performed.

If a power OFF state is determined, it is determined whether the left main battery 31L is set in a power voltage state enough to maintain a normal state (step S23 in FIG. 4A). If YES in step S23 in FIG. 4A, the LED (L4) is turned off (step S26 in FIG. 4A). It is determined whether the power ON operation is started by one of the left and right main batteries 31L and 31R (step S27 in FIG. 4A).

In this state, since the left main battery 31L is set in the power voltage state enough to maintain the normal operation, this battery power is supplied to the DC—DC converter 315. The respective operating powers are generated by the DC—DC converter 315 on the basis of the input battery power (power ON by the left main battery 31L.

In the operation decision step (step S20 in FIG. 4A) for the power switch 301, when it is determined that the power switch 301 has not been depressed for the predetermined period of time, it is determined whether the power ON state is currently set (step S21 in FIG. 4A). If YES (power ON state) in step S21 in FIG. 4A, it is determined whether the left main battery 31L is set in a power supply voltage state enough to maintain a normal operation (step S23 in FIG. 4A). If YES in step S23 in FIG. 4A, the LED (L4) is turned off (step S26 in FIG. 4A), and it is determined whether the power ON operation is started by one of the left and right main batteries 31L and 31R (step S27 in FIG. 4A).

In the power supply voltage state check for the left main battery (M-BATA) 31L (step S23 in FIG. 4A), it is determined that the power supply voltage state cannot maintain a normal operation by the left main battery (M-BATA) 31L, i.e., the low-battery state is determined, it is determined whether the right main battery (M-BATB) 31R is set in a power supply voltage state enough to maintain the normal operation (step S24 in FIG. 4A). If YES in step S24 in FIG. 4A, the main battery switch (SR0) 310b is turned on (step S25 in FIG. 4A), and the LED (L4) is turned off (step S26 in FIG. 4A). It is determined whether the power ON operation is started by one of the left and right main batteries (M-BATA and M-BATB) 31L and 31R (step S27 in FIG. 4A).

In this case, since the main battery switch (SR0) 310h is turned on, the power of the right main battery (M-BATB) 31R is supplied to the DC—DC converter 315. The DC—DC converter 315 generates the respective operating powers on the basis of the input battery power. The reverse flow preventive diode 313 prevents a flow of the power from the right main battery (M-BATB) 31R to the left main battery 31L.

In the decision step of the power ON battery (step S27 in FIG. 4A), when it is determined that the power ON operation is started by the left main battery 31L, the state display LED (L2) for the left main battery 31L emits green light (red OFF/green ON). This LED (L2) indicates that the left main battery 31L is selected and being used (step S28 in FIG. 4A; FIG. 6B). It is determined whether the left main battery 31L is set in a low-battery state (step S29 in FIG. 4B). If YES in step S29 in FIG. 4B, it is determined whether the right main battery (M-BATA) 31R is mounted (step S30 in FIG. 4B).

If the right main battery 31R is mounted, it is determined whether this battery has a power supply voltage state enough to maintain a normal operation (step S31 in FIG. 4B). If YES in step S31 in FIG. 4B, the main battery switch (SRO) 310h is turned on. The power from the right main battery (M-BATB) 31R is supplied to the DC—DC converter 315. The DC—DC converter 315 generates the respective operating powers on the basis of the input battery power (step S32 in FIG. 4B).

In this case, the state display LED (L2) for the left main battery 31L emits red light (red ON/green OFF). The LED (L2) indicates that the left main battery 31L is set in a low-battery state which requires charging (step S33 in FIG. 4B; FIG. 5C). The state display LED (L3) for the right main battery (M-BATB) 31R emits green light (red OFF/green ON). This LED (L3) indicates that the right main battery (M-BATB) 31R is selected and being used (step S34 in FIG. 4B; FIG. 6B).

In the decision step (step S30 in FIG. 4B) for the presence/absence of the right main battery 31R, when it is determined that the right main battery 31R is not mounted, or in the decision step (step S31 in FIG. 4B) for the right main battery 31R, when the right main battery 31R is set in a low-battery state which requires charging, the state display LED (L2) for the left main battery 31L flickers red light (red flicker/green OFF). The LED (L2) indicates that the left main battery 31L is set in the low-battery state which requires charging and at the same time that driving using the battery is impossible (step S39 in FIG. 4B; FIG. 5C).

In the power ON battery discrimination (step S27 in FIG. 4A), it is determined that the right main battery 31R is selected and being used, the state display LED (L3) for the right main battery (M-BATB) 31R emits green light (red OFF/green ON). This LED (L3) indicates that the right main battery (M-BATB) 31R is selected and being used (step S34 in FIG. 4B; FIG. 6B). It is determined whether the right main battery (M-BATB) 31R is set in a low-battery state (step S35 in FIG. 4B).

When the right main battery 31R is set in the low-battery state, the absence of the left main battery 31L is determined (step S36 in FIG. 4B). If the left main battery (M BATA) 31L is mounted, it is determined whether the left main battery 31L is set in a power supply voltage state enough to maintain a normal operation (step S37 in FIG. 4B).

When the left main battery 31L is set in the power supply voltage state enough to maintain the normal operation, the state display LED (L2) for the right main battery 31R emits red light (red ON/green OFF). The LED (L2) indicates that the right main battery 31R is set in the low battery state which requires charging (step S38 in FIG. 4B; FIG. 5C). The flow advances to the decision step (step S22 in FIG. 4A) for the power ON state.

In the decision step of determining whether the left main battery 31L is mounted (step S30 in FIG. 4B), or in the decision step of determining the state of the left main battery 31L (step S31 in FIG. 4B), when it is determined that the left main battery 31L is set in the low-battery state which requires charging, the LED (L3) for the right main battery 31R flickers red light (red flicker/green OFF. This LED (L3) indicates that the right main battery 31R is set in the low-battery state which requires charging and that the battery driving cannot be performed (step S40 in FIG. 4B; FIG. 5C).

The state display LED (L2) for the left main battery 31L, or the state display LED (L3) for the right main battery 31R flickers red light, a power OFF routine is started after a lapse of a preset time (three minutes in this case).

In a battery-driven state (i.e., an operation performed when the AC adapter is not connected), highly reliable operations driven by the battery can be assured for a long period of time by the power ON processing.

In this embodiment, of the pair of main batteries 31L and 31R, one main battery is semi-fixed by a screw (in this case, the left main battery 31L), and the other battery, i.e., the right main battery 31R is arbitrarily detachable by the sliding mounting means. As shown in FIGS. 7A and 7B, the main batteries 31L and 31R are constituted by battery packs having different current capacities (in this case, the 2200-mA high-capacity type and the 1700-mA low-capacity type).

As described above, charge control of the main batteries 31L and 31R is performed by the power control CPU 306 on the basis of the setup data (charge control parameter). In order to arbitrarily and selectively use the two different types of battery packs, charge current control must be performed on the basis of the setup data (charge control parameter) corresponding to the capacity types of the mounted battery packs.

For this purpose, in this embodiment, the main battery capacity switch 304 is operated to set a capacity type of the mounted battery pack, i.e., the left main battery 31L, in accordance with the capacity type of the mounted battery pack. In this case, the setup data (charge control parameter) switching process based on the battery capacity switch 304 is shown in the flow chart of FIG. 8.

In charge control of the left main battery 31L, the power control CPU 306 reads the content of the battery capacity switch 304. The power control CPU 306 determines in accordance with the content whether the current capacity of the semi-fixed mounted battery pack is the 2200-mA high-capacity type or the 1700-mA low-capacity type and controls the charge unit 311 on the basis of the charge control setup data (charge control parameter) corresponding to the determined capacity type, thereby charging the left main battery 31L at high speed in optimal conditions.

As for the battery pack detachable by the sliding mounting means, i.e., as for the right main battery 31R, the capacity type of the mounted battery pack is automatically detected and the setup data (charge control parameter) can be automatically switched, That is. in the battery pack used as the right main battery 31R, the switch operation projection 70 is mounted at the distal end portion at the predetermined position in the mounting direction (i.e., a direction of an arrow in FIG. 7B) in the 1700-mA low-capacity battery pack. A current capacity detection switch 71 operated by the projection 70 is mounted in the apparatus main body (PC main body). The power control CPU 306 detects the capacity type of the mounted battery pack on the basis of the signal from the switch 71 and performs charge control of the battery pack as the right main battery 31R by using the setup data (charge control data) corresponding to the capacity type.

with this arrangement, a battery pack having any capacity type (2200-mA high-capacity type or 1700-mA low-capacity type) may be used for the detachable right main battery (M-BATB) 31R without causing the operator to pay attention to the capacity type. The battery capacity switch 403 is once operated at the time of mounting of the pack as the left main battery (M-BATA) 31L. Therefore, any battery capacity configuration corresponding to an application purpose can be easily obtained.

In this embodiment, there is provided a function of displaying mounted states of the main batteries (M-BATA and M-BATB) 31L and 31R and their capacities (remaining capacities) in a pop-up menu shown in FIG. 14. Under the control of the power control CPU 306, in the display areas (<LEFT>E••F and <RIGHT>E••F), a battery nonmounted state is indicated by "N/A", a state in which a battery is mounted but not charged is indicated by "???". When battery charging is started, a present battery capacity is indicated with triangular marks (a maximum of seven triangular marks) in place of the battery mounted state "???".

The mounted states and capacities (remaining capacities) of the pair of left and right main batteries 31L and 31R can be easily checked by the pop-up menu.

In this embodiment, the 4- and 8-MB new memory cards can be mounted in addition to the 1- and 2-MB existing memory cards as the extension RAM 18. A common interface mechanism for the existing memory cards (1 MB and 2 MB) and the new memory cards (4 MB and 8 MB) is shown in FIGS. 9, 10A, and 10B. Of the predetermined number of pins (e.g., 40 pins), one power supply pin and one ground pin (total two pins) of each of the memory cards (1 MB and 2 MB) are assigned to new rolls to realize an interface between the existing memory cards (1 MB, 2 MB) and new memory cards (4 MB, 8 MB). One (Ta) of the two pins is assigned to an increase in address of the new memory cards (4 MB and 8 MB), and the remaining pin (Tb) is assigned to the card determination. When a terminal Tb signal (SEL) is set at high level (SEL="1"), a logic gate array for controlling the output of the incremented address (A9: the most significant bits of the 4- and 8-MB cards) is connected to the terminal Ta of the mounted memory card (4- or 8-MB new memory card).

The 4- and 8-MB new memory cards can be used in addition to the 1- and 2-MB existing memory cards as the extension RAM 18, thereby easily and arbitrarily increasing the memory capacity.

In this embodiment, the system has the built-in HDD interface (HDD-IF) 41 and can be graded up from the FDD+FDD type having two floppy disk drives (FDD(1) 32A and FDD(2) 32B) into the HDD+FDD type having one 2.5" hard disk (HDD) and one 3.5" floppy disk drive by using this interface (HDD-IF) 41. More specifically, as shown in FIGS. 11 to 13D, the FDD+FDD type base housing (FIG. 13A) 1A having the two floppy disk drives (FDD(1) 32A and FDD(2) 32B) therein and the HDD+FDD type base housing (FIG. 13B) having the 2.5" hard disk (HDD) and the 3.5" floppy disk drive are prepared. The base housing 1A (FIG. 13A) is replaced with the base housing 1B (FIG. 13B), and the mounted hard disk is connected through a built-in HDD interface (HDD-IF) 41, thereby easily up-grading the system to the HDD+FDD type system. In this case, as shown in FIGS. 13C and 13D, the 2.5" hard disk (HDD) is housed in the same type of housing as that of the 3.5" floppy disk drive and is placed on the detachable tray 111. Upon operation of an eject button 112, the 2.5" hard disk can be placed on the detachable tray 111 or ejected therefrom.

In the above embodiment, when the apparatus is set in the power OFF state, the power control CPU always monitors the operating state of the power switch 301 and the states of the power supplies and the apparatus and externally displays the states of the power supplies and the apparatus in the power OFF routine. More specifically, in the power ON routine, when an extension board is not connected to an extension connector 40 or when the extension board connected to the extension connector 40 is confirmed not to be set in a ready state, the power ON processing is executed. A power supply state is determined in the same manner as in the power ON routine, the states of the respective components of the apparatus are determined, and these operations are repeated. During this repetition, when an abnormal state of the power supply is detected, data with instructions to turn off the power supply is sent to the main CPU 11, and then power OFF processing is executed. In this power OFF processing, the respective power supplies in the apparatus except for the backup power (VBK) are cut off in a predetermined order upon reception of a response from the main CPU 11. The power OFF routine is then initiated. When the main CPU 11 receives the data with instructions to cut off the power supplies from the power control CPU 306 through the power supply control interface 28, the main CPU 11 recognizes the setup state of the resume function. When the resume function is set, resume processing using the backup RAM 19 is completed, and then response data is sent back to the power control CPU 306 through the power supply control interface 28.

The power control CPU 306 executes the power supply processing routine including charge control of the main batteries 31L and 31R and the use state control. The power control CPU 306 always monitors the states of the power supplies including the main batteries 31L and 31R and the apparatus power supply and externally displays their states.

The power control means according to the present invention is not limited to the system configuration shown in FIG. 1, but can be easily applied to another system configuration. The arrangement of the power supply circuit 30 is not limited to that of the above embodiment, but may be constituted by another arrangement as a means for recognizing the states of the main batteries 31L and 31R. In the above embodiment, the external operating power is not supplied. When the first and second main batteries are set in a rechargeable discharge limit state, the means for alarming this state by means of LEDs is exemplified. However, alarming may be performed by a combination of a visual display and a sound.

In the above embodiment, the judgment whether the batteries are in place or not, as shown in steps S2 and S8, is made by, for example, detecting the presence/absence of the output voltage of batteries 31L and 31R. The present invention is not restricted to this approach. For instance, a sensor (e.g., photosensor or DIP switch) may be installed within the main body to detect the presence/absence of batteries 31L and 31R, and then to supply the output to the parallel I/O 305, based on the contents of which the presence/absence of batteries 31L and 31R can be determined.

Although in the above embodiment, the charged or discharged state of batteries 31L and 31R is determined by comparing the output voltages of main batteries 31L and 31R with the specified parameters, as shown in step S29 of FIGS. 4A through 4C, this invention is not limited to this. For instance, the power control CPU 306 may periodically receive the output of the ammeter 312 via the A/D converter 318 and bus 307, subtract an integral value of the current value I with time t from the full capacity of batteries now in service, and when the result is smaller than a predetermined value, judge that charging is necessary.

Figure 15A:
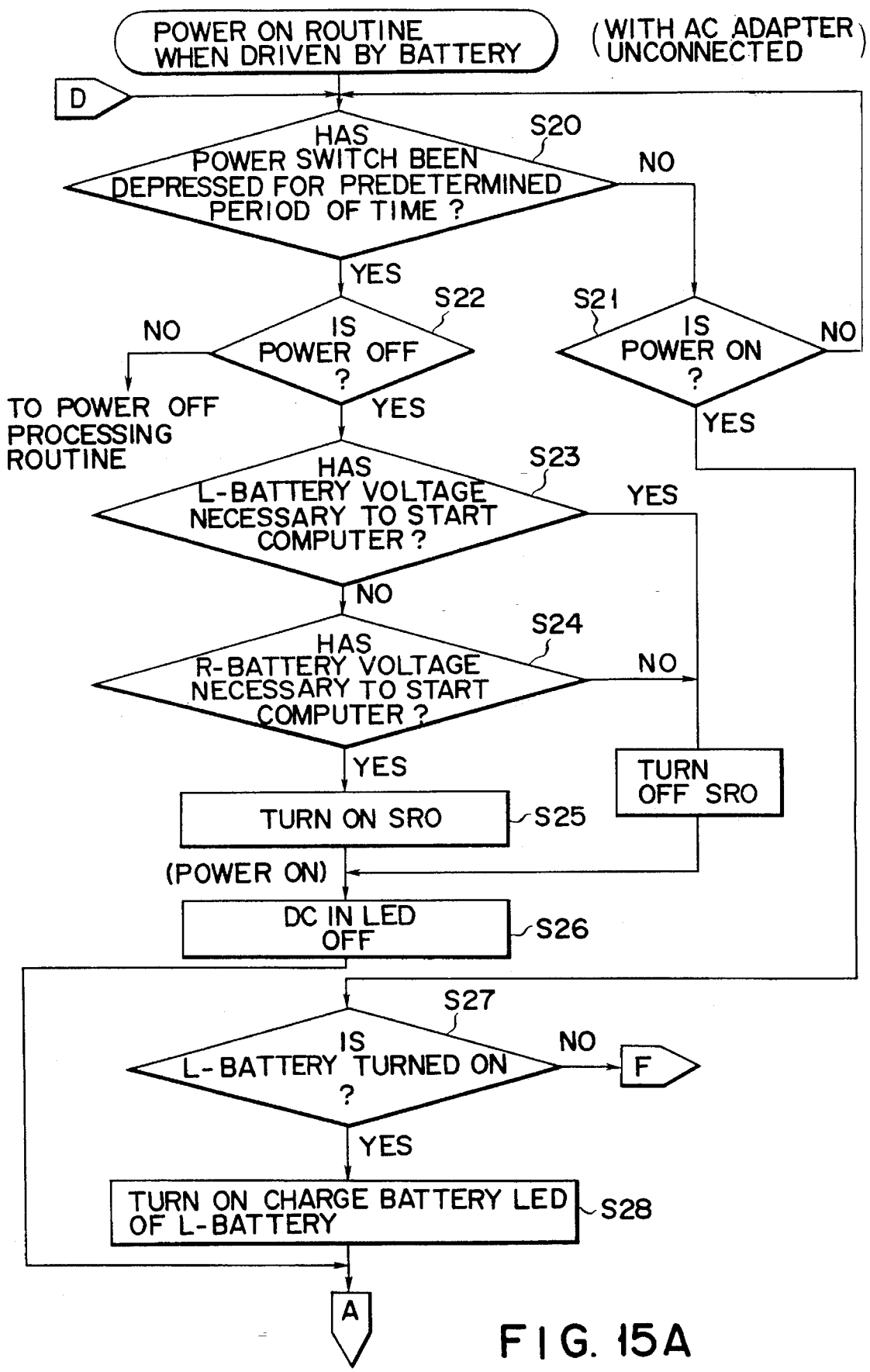
FIGS. 15A, 15B and 15C show a modification of the flow charts shown in FIGS. 4A, 4B and 4C.
Figure 15B:
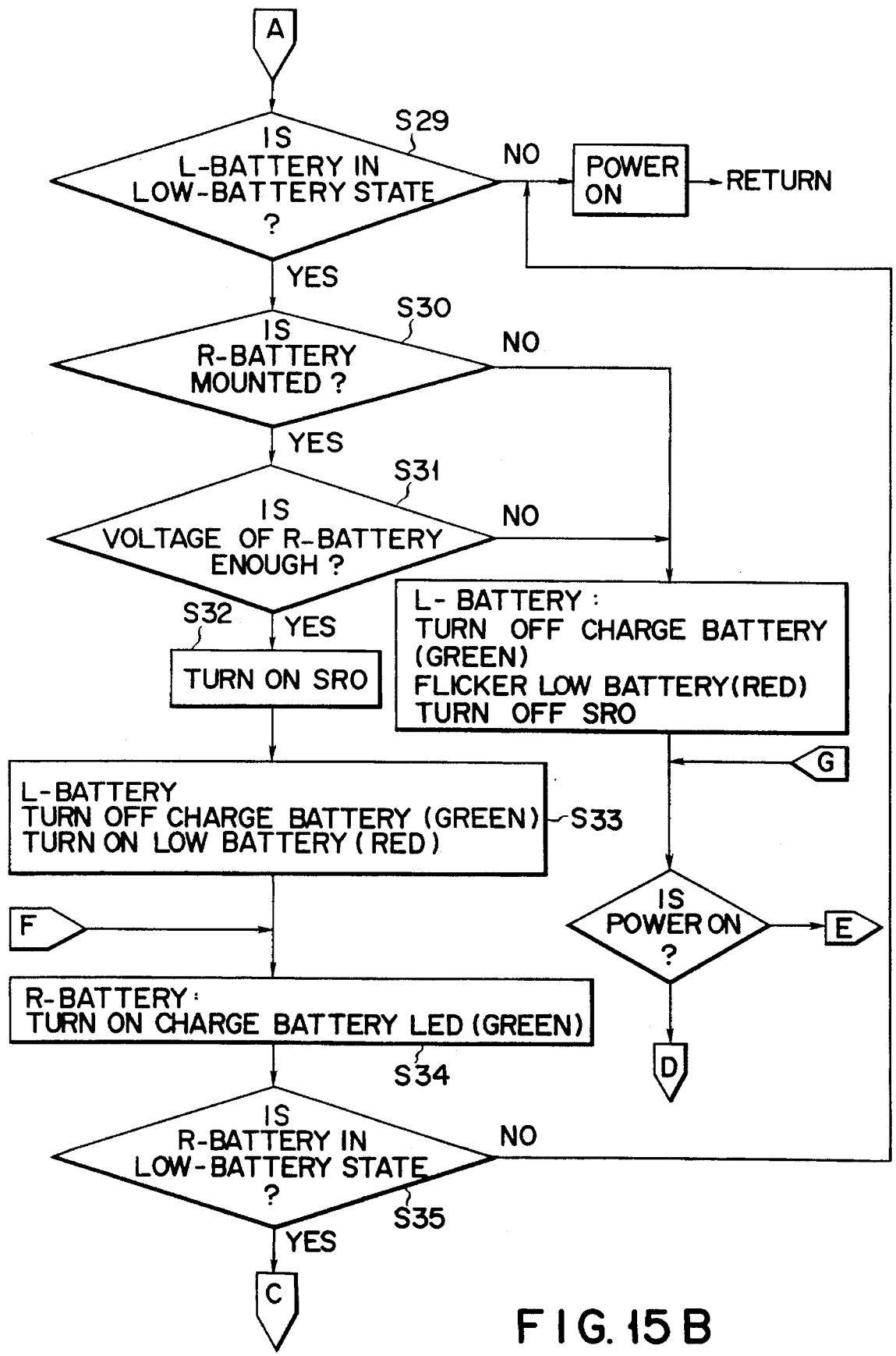
Figure 15C:
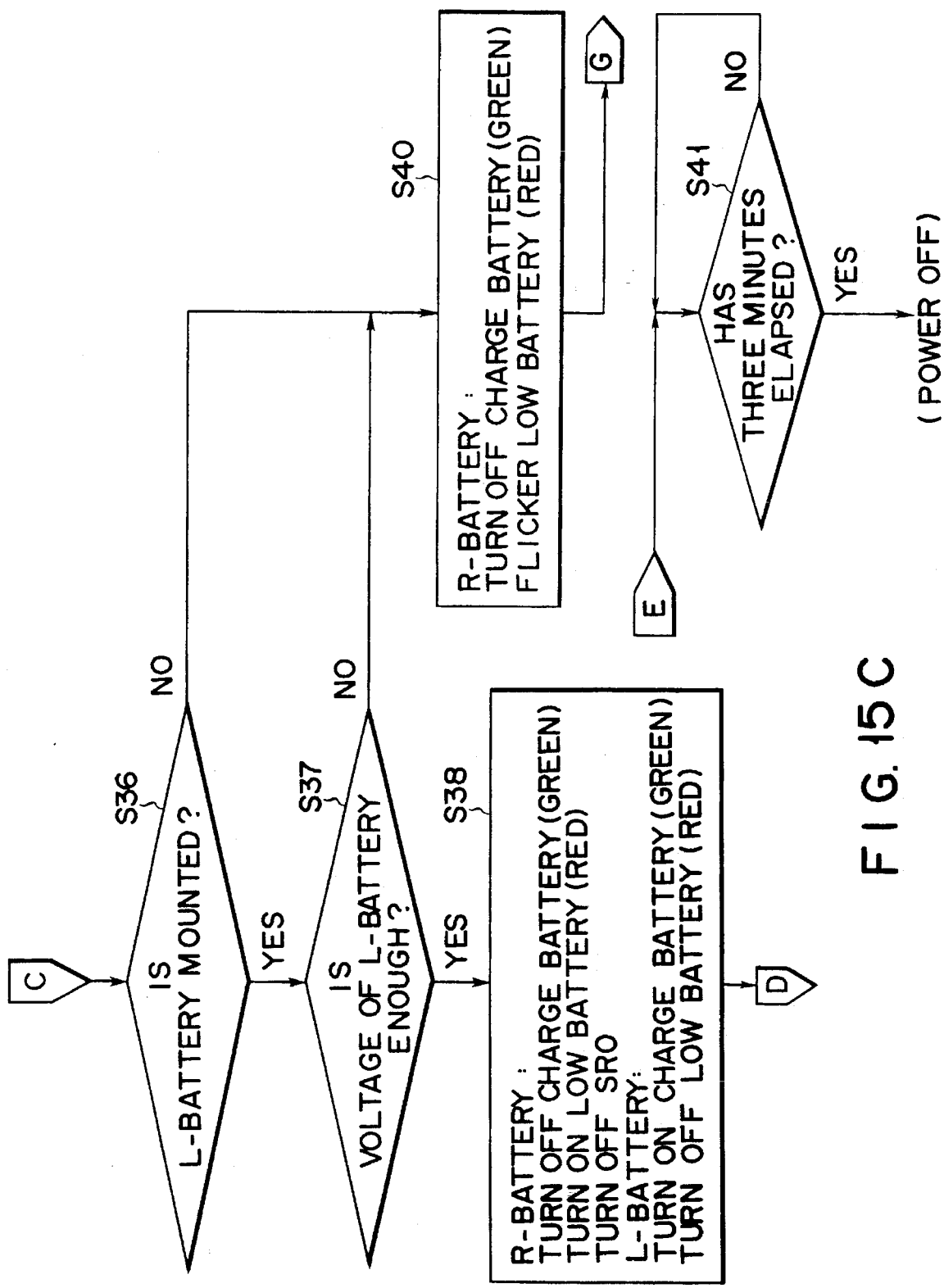

This invention is not restricted to the embodiment shown in FIG. 3 and FIGS. 4A through 4C. For instance, in FIG. 3, when NO is detected in steps S2 and S7, the control flow may be modified so as to jump to steps S7 and S13, respectively. Similarly, the flow shown in FIGS. 4A through 4C may be modified as shown in FIGS. 15A through 15C. The flow shown in FIGS. 15A through 15C is characterized in that: (1) when YES is detected in step S21, the flow will jump to step S27; (2) when YES is detected in step S23 or step S24, SR0 will be turned off; (3) after the process at step S26, the flow proceeds to step S29; (4) when NO is detected in step S29 or S35, the power-on process will be carried out; and (5) after the processes at steps S39 and S40 are complete, check is made to see if the power is presently on. If the result is a YES, then the flow will go to step S41, whereas if a NO is detected, then the flow will jump to step S20.

In the above embodiment, with no external operating power supply, when the first or second main battery is in the discharging limit state that allows charging, LED display means notifies the operator of such a situation. The informing means may be constructed in a different way; for instance, with a speaker, display and sound can be combined for the same purposes.

Accordingly, it will be appreciated that the present invention is very helpful in making full use of the easy-to-carry feature of portable computers often powered, for a long time, by batteries only, such as lap-top computers or book-type (note-type) computers.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable computer powered by batteries, comprising:
   a first rechargeable battery for outputting power;
   a second rechargeable battery for outputting power;
   operating power generating means for selecting one of said first and second rechargeable batteries and generating operating power from said selected one of said first and second rechargeable batteries;
   detecting means for detecting whether said first and second rechargeable batteries need charging;
   indicating means for indicating a charging state of each of said first and second rechargeable batteries, said charging state being one of (a) need of charging and (b) completion of charging, and (c) low battery when both of said first and second rechargeable batteries need charging.

2. A portable computer according to claim 1, wherein said indicating means includes:
   a first light-emitting element for indicating the charging state of said first rechargeable battery; and
   a second light-emitting element for indicating the charging state of said second rechargeable battery.

3. A portable computer according to claim 2, wherein
   when said first rechargeable battery needs charging after said second rechargeable battery needs charging, said first light-emitting element flickers, and
   when said second rechargeable battery needs charging after said first rechargeable battery needs charging, said second light-emitting element flickers.

4. A portable computer according to claim 2, said portable computer further comprising a main body with a keyboard and a display section pivotally mounted to said main body to allow and closing, wherein:
   said first and second light-emitting elements are positioned to be externally visible irrespective of the opening and closing of said display section.

5. A portable computer according to claim 1, further comprising:
   receiving means for receiving external power from outside the computer; and
   charging means for charging at least one of said first and second rechargeable batteries which needs charging, with the external power received by said receiving means.

6. A portable computer according to claim 5, wherein said indicating means is capable of indicating a state of (d) charging, for each of said first and second rechargeable batteries.

7. A portable computer according to claim 1, wherein said portable computer, when in operation, is using said first or second rechargeable batteries as a source of power, and further comprising means for turning off the power to the portable computer with a specified delay when both of said first and second rechargeable batteries are in need of charging.

8. A portable computer according to claim 1, wherein said indicating means further indicates which of said first and second rechargeable batteries is selected by said operating power generating means.

9. A portable computer powered by batteries comprising:
   a computer main body;
   a first rechargeable battery detachably installed in said computer main body;
   a second rechargeable battery detachably installed in said computer main body;
   operating power generating means for selecting one of said first and second rechargeable batteries and generating operating power from said selected one of said first and second rechargeable batteries;
   first detecting means for detecting whether each of said first and second rechargeable batteries is installed in said computer main body;
   second detecting means for detecting whether each of said first and second rechargeable batteries needs charging;
   indicating means for indicating a charging state of each said first and second rechargeable batteries, said charging state being one of (a) not installed, (b) need of charging, and (c) completion of charging, and (d) low battery when both of said first and second rechargeable batteries need charging.

10. A portable computer according to claim 9, wherein said indicating means includes:
    a first light-emitting element for indicating the charging state of said first rechargeable battery; and
    a second light-emitting element for indicating the charging state of said second rechargeable battery.

11. A portable computer according to claim 10, wherein
    when said first rechargeable battery needs charging after said second rechargeable battery needs charging, said first light-emitting element flickers, and
    when said second rechargeable battery needs charging after said first rechargeable battery needs charging, said second light-emitting element starts flickers.

12. A portable computer powered by batteries comprising:
    a computer main body;
    a first rechargeable battery detachably installed in said computer main body;
    a second rechargeable battery detachably installed in said computer main body;
    operating power generating means for selecting one of said first and second rechargeable batteries and generating operating power from said selected one of said first and second rechargeable batteries;
    first detecting means for detecting whether each of said first and second rechargeable batteries is installed in said computer main body;
    second detecting means for detecting whether each of said first and second rechargeable batteries needs charging;
    receiving means for receiving external power from outside the computer;
    charging means for charging at least one of said first and second rechargeable batteries which needs charging, using the external power received by said receiving means;
    indicating means for indicating a charging state of each said first and second rechargeable batteries, said charging state being one of (a) not installed, (b) need of charging, (c) charging, and (d) completion of charging, and (e) low battery when both of said first and second rechargeable batteries need charging.

13. A portable computer according to claim 12, wherein said indicating means includes:
    a first light-emitting element for indicating the charging state of said first rechargeable battery; and a second light-emitting element for indicating the charging state of said second rechargeable battery.

14. A portable computer according to claim 13, wherein when said first rechargeable battery comes to need charging while said second rechargeable battery needs charging, said first light-emitting element starts flickering, and when said second rechargeable battery comes to need charging while said first rechargeable battery needs charging, said second light-emitting element starts flickering.

* * * * *